US00RE49840E

(19) United States
(12) Reissued Patent
Deak, Sr.

(10) Patent Number: US RE49,840 E
(45) Date of Reissued Patent: Feb. 13, 2024

(54) ELECTRICAL GENERATOR WITH ROTATIONAL GAUSSIAN SURFACE MAGNET AND STATIONARY COIL

(71) Applicant: WePower Technologies LLC, Sagaponack, NY (US)

(72) Inventor: David Deak, Sr., Head of the Harbor, NY (US)

(73) Assignee: WePower Technologies LLC, Sagaponack, NY (US)

(21) Appl. No.: 17/237,974

(22) Filed: Apr. 22, 2021

Related U.S. Patent Documents

Reissue of:
(64) Patent No.: 10,270,301
Issued: Apr. 23, 2019
Appl. No.: 15/074,551
Filed: Mar. 18, 2016

U.S. Applications:
(62) Division of application No. 13/775,461, filed on Feb. 25, 2013, now Pat. No. 9,343,931.

(51) Int. Cl.
*H02K 1/2706* (2022.01)
*H02K 99/00* (2014.01)
(Continued)

(52) U.S. Cl.
CPC ..... *H02K 1/2706* (2013.01); *H01H 47/22* (2013.01); *H02K 1/02* (2013.01); *H02K 1/272* (2013.01);
(Continued)

(58) Field of Classification Search
CPC ..... H02K 1/2706; H02K 1/02; H02K 1/272; H02K 7/183; H02K 7/1853; H02K 7/1861;
(Continued)

(56) References Cited

U.S. PATENT DOCUMENTS 1,711,323 A 4/1929 Oglesby
2,703,370 A 3/1955 Johan
(Continued)

FOREIGN PATENT DOCUMENTS

CN 201490855 U 5/2010
CN 101895169 A 11/2010
(Continued)

OTHER PUBLICATIONS

Extended supplementary European Search Report issued in European Application No. 13772599.0, dated Oct. 31, 2016, 19 pages.
(Continued)

*Primary Examiner* — Kenneth Whittington
(74) *Attorney, Agent, or Firm* — Mintz, Levin, Cohn, Ferris, Glovsky and Popeo, P.C.

(57) ABSTRACT

A treble quantum dot strip array comprising a red, a green and a blue photon transparent stationary colloidal epoxy suspension volume strip segment each including a plurality of red photon emitting quantum dots responsive to an electrical signal applied thereon to provide a photon emission in the red wavelength and a uV attenuating filter, wherein each of said red, blue and green segments are disposed to form a parallel treble array of segments are disposed to provide a photon path from a photon source through said uV attenuating filter. Alternate embodiments provide a quantum dot colour electrically conductive strip to emit a selected colour in response to a corresponding electric said signal applied thereacross, and including a COB (chip on board) LED (Light Emitting Diode) array apparatus.

10 Claims, 32 Drawing Sheets

(51) Int. Cl.

| | |
|---|---|
| ***H01H 47/22*** | (2006.01) |
| ***H02K 1/02*** | (2006.01) |
| ***H02K 1/272*** | (2022.01) |
| ***H02K 7/18*** | (2006.01) |
| ***H02K 21/14*** | (2006.01) |
| ***H02K 21/24*** | (2006.01) |
| ***H02K 35/02*** | (2006.01) |

(52) U.S. Cl.
CPC ..... *H02K 7/183* (2013.01); *H02K 7/1853* (2013.01); *H02K 7/1861* (2013.01); *H02K 21/145* (2013.01); *H02K 21/24* (2013.01); *H02K 35/02* (2013.01); *H02K 99/10* (2016.11); *H01H 2231/032* (2013.01); *H02K 2201/18* (2013.01)

(58) Field of Classification Search
CPC ..... H02K 21/145; H02K 21/24; H02K 35/02; H02K 99/10; H02K 2201/18; H01H 47/22; H01H 2231/032
USPC ..... 310/156.01, 156.07, 156.38, 261.1
See application file for complete search history.

(56) References Cited

U.S. PATENT DOCUMENTS 3,027,499 A 3/1962 Holdway
3,218,523 A 11/1965 Eugene
3,315,104 A 4/1967 Barr
3,348,080 A 10/1967 Lair
3,398,302 A 8/1968 Hans-dieter et al.
3,500,082 A 3/1970 Tolegian
3,621,419 A 11/1971 Adams et al.
3,671,777 A 6/1972 Newell
3,673,999 A 7/1972 Lacy et al.
3,895,244 A 7/1975 Link
3,984,707 A 10/1976 Mcclintock
4,187,452 A 2/1980 Knappe et al.
4,257,010 A 3/1981 Bergman et al.
4,260,901 A 4/1981 Woodbridge
4,315,197 A 2/1982 Studer
4,363,980 A 12/1982 Petersen
4,412,355 A 10/1983 Terbrack et al.
4,471,353 A 9/1984 Cernik
4,521,712 A 6/1985 Braun et al.
4,703,293 A 10/1987 Ono et al.
4,752,706 A 6/1988 Meszaros
4,855,699 A 8/1989 Hoegh
4,866,321 A 9/1989 Blanchard et al.
4,870,306 A 9/1989 Petersen
5,053,659 A 10/1991 Parker
5,183,056 A 2/1993 Dalen et al.
5,204,570 A 4/1993 Gerfast
5,275,141 A 1/1994 Tsunoda et al.
5,499,013 A 3/1996 Konotchick
5,608,366 A 3/1997 Sako
5,708,406 A * 1/1998 Tsunoda ..... H01F 7/14 310/216.022
5,808,381 A 9/1998 Aoyama et al.
5,872,407 A 2/1999 Kitaoka et al.
5,990,583 A 11/1999 Nanba et al.
6,069,420 A 5/2000 Mizzi et al.
6,259,372 B1 7/2001 Taranowski et al.
6,326,714 B1 12/2001 Bandera
6,630,894 B1 10/2003 Boyd et al.
6,659,176 B2 12/2003 Mahadevaiah
6,700,310 B2 3/2004 Maue et al.
6,720,681 B2 4/2004 Hsiao
6,720,682 B2 4/2004 Hatam-tabrizi et al.
6,879,076 B2 4/2005 Long
7,015,778 B2 3/2006 Fukushima et al.
7,021,603 B2 4/2006 Wygnaski
7,026,900 B1 4/2006 Gregory et al.
7,106,159 B2 9/2006 Delamare et al.
7,151,332 B2 12/2006 Kundel
7,315,098 B2 1/2008 Kunita et al.
7,378,765 B2 5/2008 Iwasa et al.
7,382,106 B2 6/2008 Kundel
7,400,069 B2 7/2008 Kundel
7,436,082 B2 10/2008 Ruse et al.
7,495,656 B2 2/2009 Yuba et al.
7,688,036 B2 3/2010 Yarger et al.
7,710,227 B2 5/2010 Schmidt
7,906,877 B2 3/2011 Ishiyama et al.
7,906,920 B2 3/2011 Imagawa
8,148,856 B2 4/2012 Bataille et al.
8,299,659 B1 10/2012 Bartol, Jr.
8,330,283 B2 12/2012 Lin
8,514,040 B2 8/2013 Gruner
8,539,765 B2 9/2013 Miller
8,624,447 B2 1/2014 Cartier Millon et al.
8,629,572 B1 1/2014 Phillips
8,633,604 B2 1/2014 Miller
8,633,605 B2 1/2014 Esteve Tinto et al.
8,729,747 B2 5/2014 Arnold et al.
8,773,226 B2 7/2014 Li et al.
8,816,557 B2 8/2014 Long et al.
8,907,505 B2 12/2014 Fortier et al.
9,303,628 B2 4/2016 Fortier et al.
9,343,931 B2 5/2016 Deak et al.
9,543,817 B2 1/2017 Deak, Sr.
9,673,683 B2 6/2017 Deak, Sr.
9,843,248 B2 12/2017 Deak, Sr.
9,923,443 B2 3/2018 Deak, Sr.
10,270,301 B2 4/2019 Deak, Sr.
10,348,160 B2 7/2019 Deak, Sr.
10,396,642 B2 8/2019 Petrick
10,523,098 B1 12/2019 Bowen
10,707,706 B2 7/2020 Yu
10,855,158 B2 12/2020 Hwang et al.
11,251,007 B2 2/2022 Deak, Sr.
2001/0045785 A1 11/2001 Chen et al.
2002/0070712 A1 6/2002 Arul
2002/0130561 A1 9/2002 Temesvary et al.
2002/0190610 A1 12/2002 Andre et al.
2003/0025416 A1* 2/2003 Sullivan ..... H02K 1/02 310/162
2003/0155771 A1 8/2003 Cheung et al.
2003/0197433 A1 10/2003 Cheung et al.
2004/0051416 A1 3/2004 Yamada et al.
2004/0078662 A1 4/2004 Hamel et al.
2004/0124729 A1* 7/2004 Long ..... H02K 1/02 310/80
2004/0128781 A1 7/2004 Kunita et al.
2004/0174287 A1 9/2004 Deak
2004/0222709 A1 11/2004 Naganuma et al.
2005/0006961 A1 1/2005 Shen
2005/0023905 A1 2/2005 Sakamoto
2005/0168108 A1 8/2005 Face
2005/0280316 A1 12/2005 Nozawa et al.
2006/0175923 A1* 8/2006 Abou Akar ..... H02K 1/278 310/114
2006/0234669 A1 10/2006 Rode
2006/0237968 A1 10/2006 Chandrasekaran
2006/0244316 A1 11/2006 Kundel
2006/0244327 A1 11/2006 Kundel
2006/0267418 A1 11/2006 Kundel
2008/0048506 A1 2/2008 Deak
2008/0079319 A1 4/2008 Ishiyama et al.
2008/0211435 A1* 9/2008 Imagawa ..... H02K 16/00 318/130
2011/0001381 A1 1/2011 Mcdaniel
2011/0140563 A1* 6/2011 Beranger ..... H02K 21/145 310/195
2011/0254285 A1 10/2011 Hanchett, Jr.
2011/0273052 A1* 11/2011 Long ..... B62J 6/06 310/208
2012/0104765 A1* 5/2012 Esteve Tinto ..... H02K 35/02 310/38
2012/0133234 A1* 5/2012 Da Costa Balas Ferreira ..... H02K 21/26 310/179

(56) References Cited

U.S. PATENT DOCUMENTS

| | | | | |
|---|---|---|---|---|
| 2013/0033042 | A1 | 2/2013 | Fortier et al. | |
| 2013/0088018 | A1 | 4/2013 | Kobayashi | |
| 2013/0093540 | A1 | 4/2013 | Ruff | |
| 2013/0127268 | A1* | 5/2013 | Atherton | H02K 7/1853 310/46 |
| 2013/0342037 | A1 | 12/2013 | Kawarai et al. | |
| 2014/0246961 | A1* | 9/2014 | Smith | H02K 49/106 310/75 R |
| 2014/0375164 | A1 | 12/2014 | Deak et al. | |
| 2015/0015104 | A1 | 1/2015 | Kataoka et al. | |
| 2015/0076832 | A1 | 3/2015 | Fortier et al. | |
| 2015/0091395 | A1 | 4/2015 | Spivak | |
| 2015/0091479 | A1 | 4/2015 | Spivak | |
| 2015/0279598 | A1 | 10/2015 | Matsumoto et al. | |
| 2015/0357893 | A1 | 12/2015 | Deak, Sr. | |
| 2016/0134173 | A1 | 5/2016 | Deak, Sr. | |
| 2016/0204665 | A1 | 7/2016 | Deak, Sr. | |
| 2016/0359401 | A1 | 12/2016 | Deak, Sr. | |
| 2017/0077794 | A1 | 3/2017 | Deak, Sr. | |
| 2017/0346377 | A1 | 11/2017 | Deak, Sr. | |
| 2018/0145561 | A1 | 5/2018 | Deak, Sr. | |
| 2019/0131098 | A1 | 5/2019 | Deak, Sr. | |
| 2021/0143719 | A1 | 5/2021 | Deak, Sr. | |
| 2022/0020550 | A1 | 1/2022 | Deak, Sr. | |
| 2022/0416635 | A1 | 12/2022 | Deak et al. | |
| 2023/0137951 | A1 | 5/2023 | Deak, Sr. | |

FOREIGN PATENT DOCUMENTS

| | | | |
|---|---|---|---|
| CN | 203166718 | U | 8/2013 |
| CN | 106992649 | A | 7/2017 |
| DE | 3218181 | A1 | 11/1983 |
| DE | 102006013237 | A1 | 10/2007 |
| DE | 102010017874 | A1 | 10/2011 |
| EP | 0948018 | A2 | 10/1999 |
| EP | 1936787 | A1 | 6/2008 |
| EP | 2079154 | A2 | 7/2009 |
| EP | 2178738 | A1 | 4/2010 |
| EP | 2272742 | A1 | 1/2011 |
| EP | 2834907 | A1 | 2/2015 |
| EP | 3059850 | A1 | 8/2016 |
| EP | 3215726 | A1 | 9/2017 |
| EP | 3704785 | A1 | 9/2020 |
| JP | H11264368 | A | 9/1999 |
| JP | 2009261204 | A | 11/2009 |
| JP | 2011130654 | A | 6/2011 |
| WO | 9628873 | A1 | 9/1996 |
| WO | 0122587 | A1 | 3/2001 |
| WO | 0237516 | A2 | 5/2002 |
| WO | 2009015910 | A1 | 2/2009 |
| WO | 2013031127 | A1 | 3/2013 |
| WO | 2013035057 | A2 | 3/2013 |
| WO | 2013151631 | A1 | 10/2013 |
| WO | 2016074003 | A1 | 5/2016 |
| WO | 2017086886 | A2 | 5/2017 |
| WO | 2019089435 | A1 | 5/2019 |
| WO | 2021102316 | A1 | 5/2021 |

OTHER PUBLICATIONS https://www.google.com/search?q=magnetic+interaction&biw=1920&bih=1115&source=Inms&tbm=isch&sa=X&ved=OahUKEwjby5SLtuHKAhUCOWMKHaQUDb4Q_AUIBigB#imgrc=rCMVDdr681uSXM%3A, U.S. Appl. No. 14/715,971 in Office Action dated Feb. 11, 2016 is currently unavailable and may have been archived by not available.

International Preliminary Report on Patentability received for PCT International Application No. PCT/US2018/057957, dated May 14, 2020, 5 pages.

International Search Report received for PCT Patent International Application No. PCT/US2007/017325, dated Aug. 7, 2008, 8 pages.

International Search Report received for PCT Patent International Application No. PCT/US2018/057957, dated Feb. 25, 2019, 6 pages.

Office Action issued in European Application No. 13772599.0, dated Jun. 30, 2017, 12 pages.

Office Action issued in European Application No. 13772599.0, dated Nov. 17, 2017, 4 pages.

Partial supplementary European Search Report issued in European Application No. 13772599.0, dated Jul. 1, 2016, 7 pages.

International Search Report for PCT Application No. PCT/US2020/061590, dated Feb. 25, 2021, 4 pages.

Extended European Search Report issued in European Application No. 18874872.7, dated Jul. 8, 2021, 6 pages.

* cited by examiner

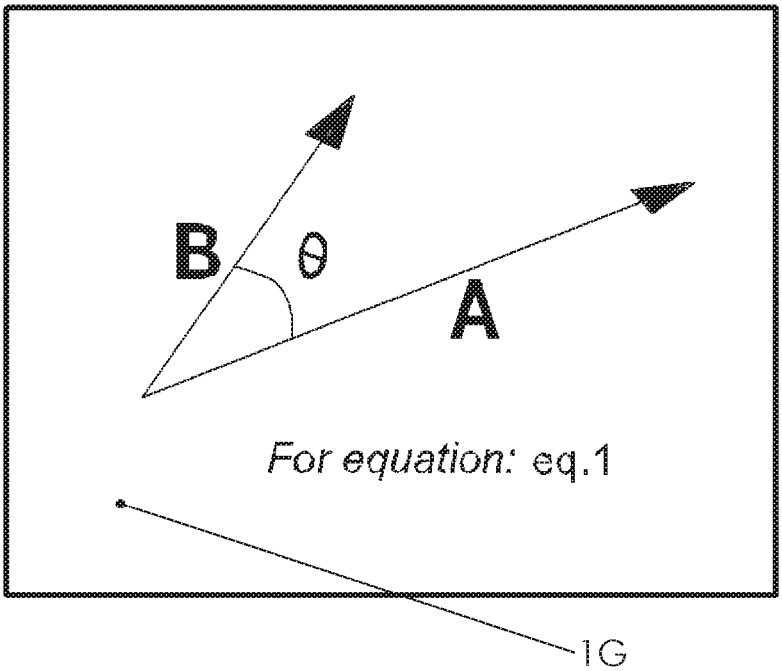
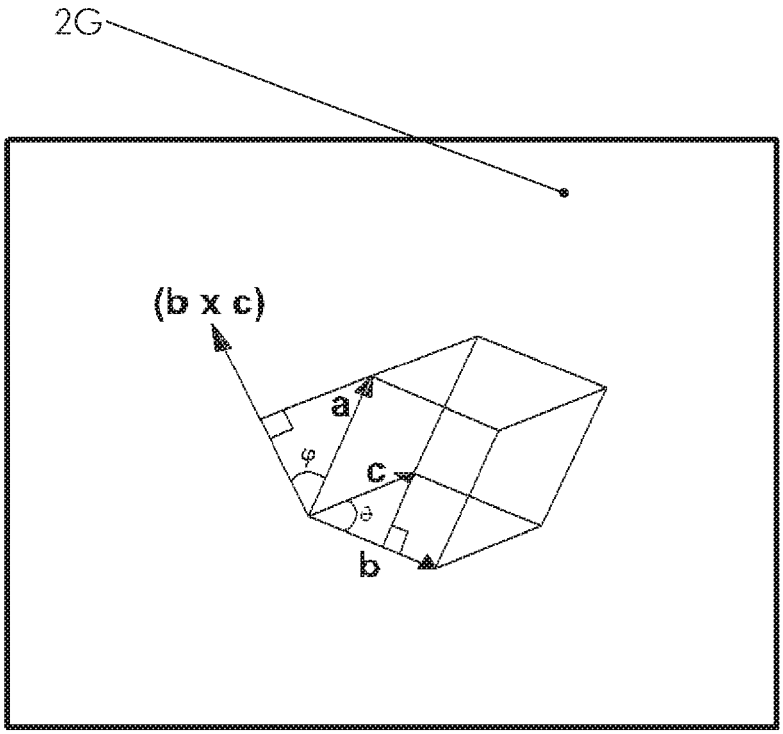
FIG 10

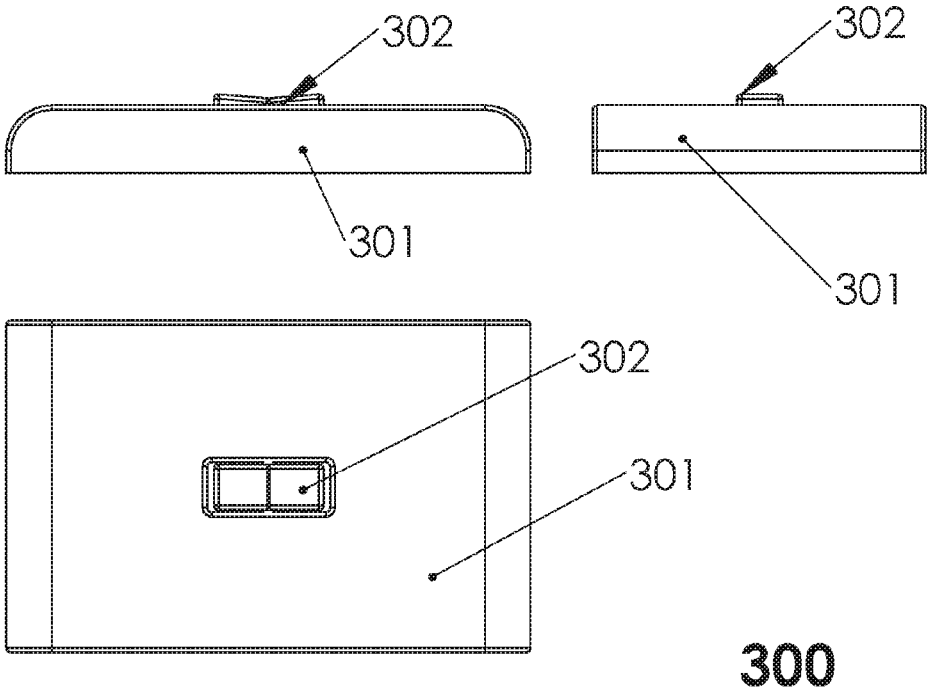
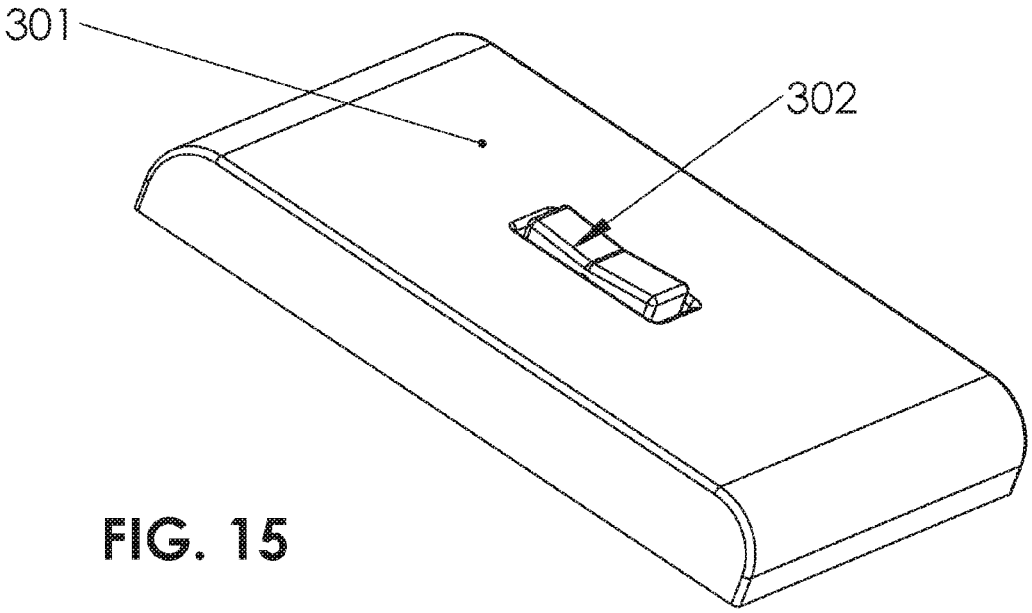
FIG. 15

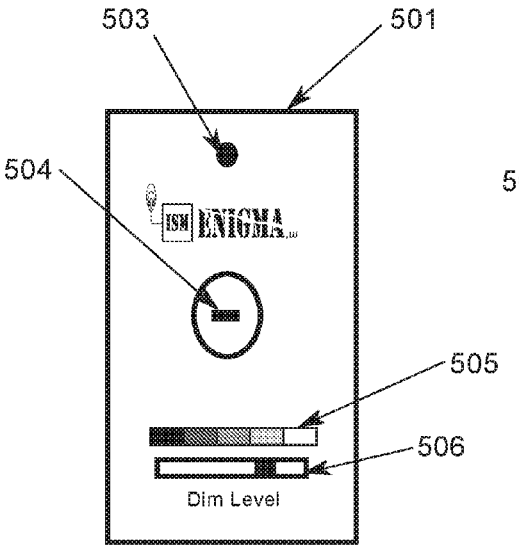

1. User preselect dimming.

2.Single key code generated as a number (n) along with dimming level value.

3. Single transmitting frequency.

4. Switch is flicked and key code plus dim level is transmitted.

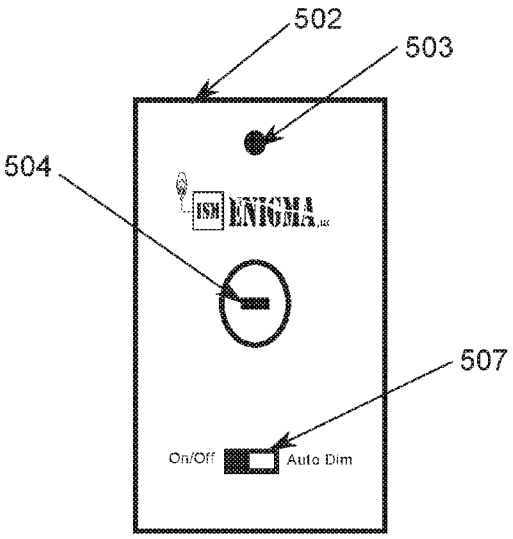

1. Auto dimming model.

2. Single key code, with least significant bit added to change the key code by (n+1).

3.Dimming level slowly increases and decreases, and user selects comfort level and then flicks switch to stop and memorize dim level.

4. Switch is flicked in either On/Off or Auto Dim selection and infromation is transmitted.

500

FIG. 29

ELECTRICAL GENERATOR WITH ROTATIONAL GAUSSIAN SURFACE MAGNET AND STATIONARY COIL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is an application for reissue of U.S. Pat. No. 10,270,301, issued on Apr. 23, 2019, entitled "ELECTRICAL GENERATOR WITH ROTATIONAL GAUSSIAN SURFACE MAGNET AND STATIONARY COIL" and filed on Mar. 18, 2016, as U.S. patent application Ser. No. 15/074,551, which is a divisional application of U.S. patent application Ser. No. 13/775,461, filed on Feb. 25, 2013, now U.S. Pat. No. 9,343,931.*

BACKGROUND OF THE INVENTION

The present invention relates to electric generators and the generation of electricity from same; along with a plurality of novel embodiments and applications utilizing these features of novelty. The evolution of electric generators since the inception of Galvani and later Faraday in 1821 and in 1831; has progressed along the conventional knowledge of moving a coil through a stationary magnetic field or in some demonstrable instances, the motion of a magnet through a stationary coil. However the dominating influence of generators incorporating an internal moving coil about a stationary magnetic field remains the mainstay of global electrical power generation on any scale. Further, in all cases of a magnet in motion about a stationary coil, the shape of said magnet(s) is of the bar, horseshoe, or other non-spherical magnet shape means; nor a magnetic shape means of encompassing a 360 degree circle as part and parcel to said magnet(s). This is true even after the infusion of so many patents of prior art credited to Thomas Edison, Nicola Tesla and historically a multitude of others contributing prior art patents granted.

SUMMARY OF THE INVENTION

This present invention and improvement over prior art, relates to a plurality of embodiments for generating electrical energy utilizing a mathematically valid Gaussian Surface spherical or an axial-spherical permanent magnet means or a plurality of a spherical or axial-spherical permanent magnet means, but not confined to only a spherical shaped magnet means; as the source of magnetic lines of a circuitous encompassing force field from magnetic pole to magnetic pole.

The present invention also relates to an embodiment for generating electrical energy utilizing a non-magnetic spherical or axial-spherical material means that utilizes a non-spherical magnet as an enclosed embodiment member; said non-spherical magnet member means can be of a cylinder or disk magnet member means enclosed within or on said surface of said non-magnetic spherical or axial material means.

The present invention also relates as an embodiment for generating electrical energy utilizing a "centred axle" Gaussian Surface or modified "centred axle" Gaussian Surface, which either having a distribution of a magnetic field as the source of magnetic lines of a circuitous encompassing force field from magnetic pole to magnetic pole utilized to generate and induced voltage as determined by the Faraday equation;

$$E = -N\frac{d\phi_B}{dt}.$$

Said magnetic field of said "centred axle" Gaussian Surface embodiment can exist as intrinsic and characteristic to a permanent magnet shaped as "centred axle" Gaussian Surface or a single or plurality of permanent magnets distributed throughout the circumference of a non-magnetic material means Gaussian Surface. NOTE: A mathematically valid Gaussian Surface is defined as a three dimensional space closed surface.

Said present invention teaches that momentary or sustained movement of a rotating spherical or axial-spherical permanent magnet and its associated surrounding and encompassing magnetic field lines of force generates electrical power by the action of said lines of force cutting through a stationary coil of insulated wire whose wire alignment is perpendicular to said lines of force at all intervals of time.

This action of electrical power generation is achieved either by a simple rotating Gaussian Surface spherical permanent magnet means or a rotating axial-spherical permanent magnet means, whereby said Gaussian Surface spherical permanent magnet means or a rotating axial-spherical permanent magnet means free to move omnidirectionally about its centre axis point, at the centre of a stationary coil, and said coil is fixed to an attached base of a mounting substrate. Said present invention also teaches that strategic placement of a focus magnet or a plurality of focus magnets around the outside of said stationary coil, whose magnetic field lines are aligned parallel to the planar surface of said stationary coil and perpendicular to any instant point along said coil winding, will enhance the Faraday effect for optimum efficiency.

Variations of said present invention's method means of rotating a permanent magnetic field normal to the coil wire's position, whereby said permanent magnetic field is rotating about the centre core epicentre of said coil is not restricted to being at epicentre and can be a plurality of rotating permanent magnets that are positioned normal and off-centre to said coil wires. Said coil in a plurality of permanent magnets can have a plurality of shapes; such as a circle, oval, square, or rectangular shape geometry. Said coil member means is not restricted to one coil and can have as an embodiment; a plurality of coil member means that are positioned around the said epicentred spherical magnetic member means.

Another aspect of embodiments of said present invention is utilized in a sufficiently scaled configuration, utilized to power an ISM (Industrial, Scientific, and Medical) band low RF power transceiver device means, such as a ZigBee or similar transceiver device means, but not restricted to any one transmitter or transceiver means to remotely control and operate an electrical appliance means or general load such as lighting systems, motors, or other electrical apparatus means. The primary purpose of said present invention in this instance is to eliminate the battery requirement for such device means. It is the intention of said present invention to utilize an ISM band low power RF transceiver member means that is to turn on and off electrical lighting, and is designed to include a intensity dimming means in addition to said on/off switching means.

Another aspect of embodiments of said present invention is utilized in a sufficiently "scaled-up" configuration to transduce the energy contained in ambient environmental air (wind) movement into harvested electrical energy for introducing and releasing said electrical energy into power mains grid networks; as a means for reducing home, commercial, or industrial electrical energy costs in addition to land vehicles, aircraft, or sea craft.

Another aspect of embodiments of said present invention is utilized in a sufficiently "scaled-up" configuration to transduce the energy contained in ambient environmental air (wind) movement into harvested electrical energy for utilization in motor vehicles of the classifications of internal combustion, hybrid, or total electric operation for increasing the efficiency and usable mileage per charge on said vehicle classifications.

Another aspect of embodiments of said present invention is utilizing a Gaussian Surface spherical or axial-spherical neodymium or other rare earth magnet that has its magnetic poles normal to its horizontal spherical axis.

Another aspect of embodiments of said present invention is to utilize a flat planar coil of wire sufficient to generate scaled applicable electrical energy for any intended application.

Another aspect of embodiments of said present invention is to utilize a flat planar coil of wire that has at its centre, a thru-hole for placement of said spherical or axial-spherical magnet means and said magnet means can rotate within said thru-hole.

Another aspect of embodiments of said present invention is to utilize a flat planar coil of wire that has at its centre, a thru-hole or modified hole to accommodate a spherical or axial-spherical magnet means where said axial-spherical magnet axis can rotate on bearings that are utilized to prolong rotational spin after a force is applied to induce prolonged spin Another aspect of embodiments of said present invention is to utilize a plurality of Gaussian Surface spherical or axial-spherical magnets aligned in a common axial configuration within the centre section of a coil for the purpose of increasing the electrical power output capacity of said present invention.

Another aspect of embodiments of said present invention is to utilize a plurality of coils in conjunction with a plurality of Gaussian Surface spherical or axial-spherical magnets to increase the power output of said present invention.

Another aspect of embodiments of said present invention is to utilize a focus or alignment magnet means, or a plurality of focus or alignment magnet means, physically installed and situated in a manner that has its intrinsic magnetic field lines of force parallel to the horizontal flat planar surface region of said coil. The purpose of which is to concentrate said lines of force from said Gaussian Surface magnet or plurality of magnets to increase power output of said present invention, satisfying the Faraday equation;

$$E = -N\frac{d\phi_B}{dt}.$$

Note: E is the induced voltage, $$\frac{d\phi_B}{dt}$$

is the time derivative of the change in the superimposed ambient magnetic field$\varphi_B$ of said neodymium magnet that is concentrated by said focusing magnets, –N is the number of turns of the coil and the minus sign indicates that the EMF induced in an electric circuit always acts in such a direction that the current it drives around the circuit, opposes the change in magnetic flux which produces the EMF.

Another aspect of said present invention is to utilize the inherent characteristic of relative angle of said ambient magnetic field against said stationary position of said coil member means as a methodology of measuring angular deviation for any useable purpose. Whereby any such angular deviation of either said magnetic field of said Gaussian Surface magnet relative to said stationary coil will cause an induced voltage and whose magnitude and polarity is determined by the two dimensional dot product of the stationary coil position and alignment vector and the directional and polar position and alignment vector of said Gaussian Surface magnetic field as expressed as;

$A_S \cdot B_M$=the dot product:

$$A_S \cdot B_M = |A_S| * |B_M| * \cos(\Theta);$$

where $A_S$ and $B_M$ are vectors; as example vector $A_S$ is the stationary coil wire position in space and vector $B_M$ is the polar direction of the moveable North pole of the Gaussian Surface magnetic field.

Given the characteristics of the cosine function, one can deduce three possible conditions:

1. If $A_S$ and $B_M$ are perpendicular (at 90 degrees to each other), the result of the dot product will be zero, because cos(Θ) will be zero.
2. If the angle between $A_S$ and $B_M$ are less than 90 degrees, the dot product will be positive (greater than zero), as cos(Θ) will be positive, and the vector lengths are always positive values.
3. If the angle between $A_S$ and $B_M$ are greater than 90 degrees, the dot product will be negative (less than zero), as cos(Θ) will be negative, and the vector lengths are always positive values.

Another aspect of said present invention is in a condition where the converse holds true, where said moving Gaussian Surface magnetic field is held stationary and said coil is then made moveable, and the dot product of said two vectors;

$A_M \cdot B_S$=the dot product:

$$A_M \cdot B_S = |A_M| * |B_S| * \cos(\Theta);$$

where $A_M$ and $B_S$ are vectors; as example vector $A_M$ is the moving coil wire position in space and vector $B_S$ is the polar direction of the North pole of the stationary Gaussian Surface magnetic field.

Given the characteristics of the cosine function, one can deduce three possible conditions:

1. If $A_M$ and $B_S$ are perpendicular (at 90 degrees to each other), the result of the dot product will be zero, because cos(Θ) will be zero.
2. If the angle between $A_M$ and $B_S$ are less than 90 degrees, the dot product will be positive (greater than zero), as cos(Θ) will be positive, and the vector lengths are always positive values.

3. If the angle between $A_M$ and $B_S$ are greater than 90 degrees, the dot product will be negative (less than zero), as cos(Θ) will be negative, and the vector lengths are always positive values.

This aspect of said present invention can see appliqués in two dimensional directional guidance and other usage in angular determination and detection applications; where an induced coil voltage represents a two dimensional differential angular condition, 180 value and direction and recognized as a usable two dimensional coefficient in any applied analysis system means.

The general reference equation 1:

$$A^{\circ}B=AB\cos(\theta) \quad \text{eq.1}$$

Another aspect of said resent invention is in the three dimensional analysis of yaw, pitch, and roll coefficients in guidance systems or any three dimensional positional identification system means.

The triple product general equation:

The triple product of a set of vectors a, b, and c is given by

The dot product of vector a, and the cross product of vectors b and c;

$$a^{\circ}(b\times c) \quad \text{eq. 2}$$

This referring to FIG. 14 graph 1G.

The value of the triple product is equal to the volume of the parallelepiped constructed from the vectors.

$$\text{volume}=abc\cdot\sin(\theta)\cos(\varphi) \quad \text{eq. 3}$$

$$a^{\circ}(b\times c)=a|b\times c|\cos(\varphi)=abc\cdot\sin(\theta)\cos(\varphi) \quad \text{eq. 4}$$

This referring to FIG. 14 graph 2G

The triple product has the following properties $$a^{\circ}(b\times c)=(b\times c)^{\circ}a \quad \text{eq. 5}$$

$$a^{\circ}(b\times c)=c^{\circ}(a\times b)=b^{\circ}(c\times a) \quad \text{eq. 6}$$

$$a^{\circ}(b\times c)=-a^{\circ}(c\times b) \quad \text{eq. 7}$$

Further where a is the coil wire direction vector, b is the Gaussian Surface magnetic field vector, and C is the vertical position of said Gaussian Surface magnet compared to its deviation from the center of said coil, i.e. either dead center and level with coil surface plane, coil-centered axis but left angular tilt from coil surface, or coil-centered axis but right angular tilt from coil surface.

Another aspect of said present invention is for three dimensional detection of movement in yaw, roll, and the depth from coil-center axis either above or below said coil-center axis and defined as;

Where Vectors: $a_y$=yaw, $b_r$=roll, and $c_d$=depth from coil-center axis either above or below said coil-center axis.

Ergo, with vector analysis using dot and cross product results those additional aspects of said present invention include; a method means of utilizing a stationary coil member means with a moving Gaussian Surface magnetic means capable of moveable freedom within a three dimensions and said coil establishing a voltage, whose value and polarity are the resultant of movement of said Gaussian Surface magnet member means. Further it is also an alternative method means of utilizing a stationary Gaussian Surface magnet member means, and utilizing a moveable coil member means about the three dimensional volume of said centered Gaussian Surface magnet member means; and said coil establishing a voltage, whose value and polarity are the resultant of movement of said coil member means.

BRIEF DESCRIPTION OF THE DRAWINGS

FIG. 10 is a graph drawing of vectors for reference equation #1, and vector diagram of three combined vectors.

FIG. 15 is a perspective multi-view of a switch enclosure exposing a rocker style switch movement means.

FIG. 29 shows two different models for light dimming.

DETAILED DESCRIPTION OF THE PREFERRED EMBODIMENTS

Figure 1:
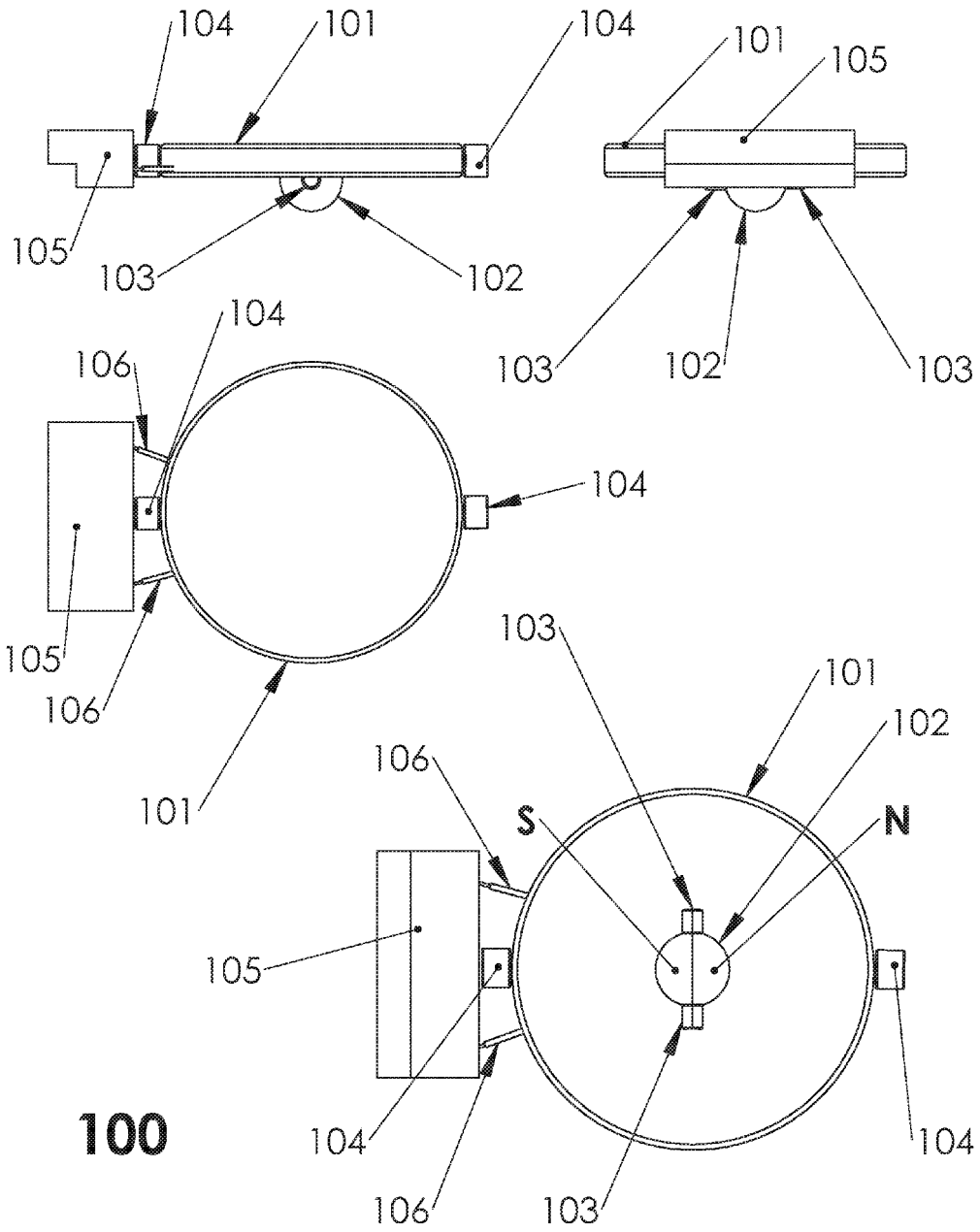
FIG. 1 shows the present invention with coil-wire form with a Topological "genus of one", rotating magnet, focusing magnets, and energy converter or appliance.

With reference to FIG. 1 there is shown an embodiment 100 of a "stationary coil" electrical generator 101 in communication with a "centred axle" magnet 102, and also in communication with at least one or a plurality of focus magnets 104"all" combined 325 electromechanically and utilized as a power source means 101 & 102 for an electrical power load 105 in the form of a ISM band transceiver 105 for the purpose of powering momentarily, said transceiver 105 to emit electromagnetic waves of radio frequencies that are modulated with a digital code sequence but not limited to utilization as a power source for an electrical power load in the form of a ISM band transceiver and further can 330 be utilized for a plurality of power source applications means.

Figure 1A:
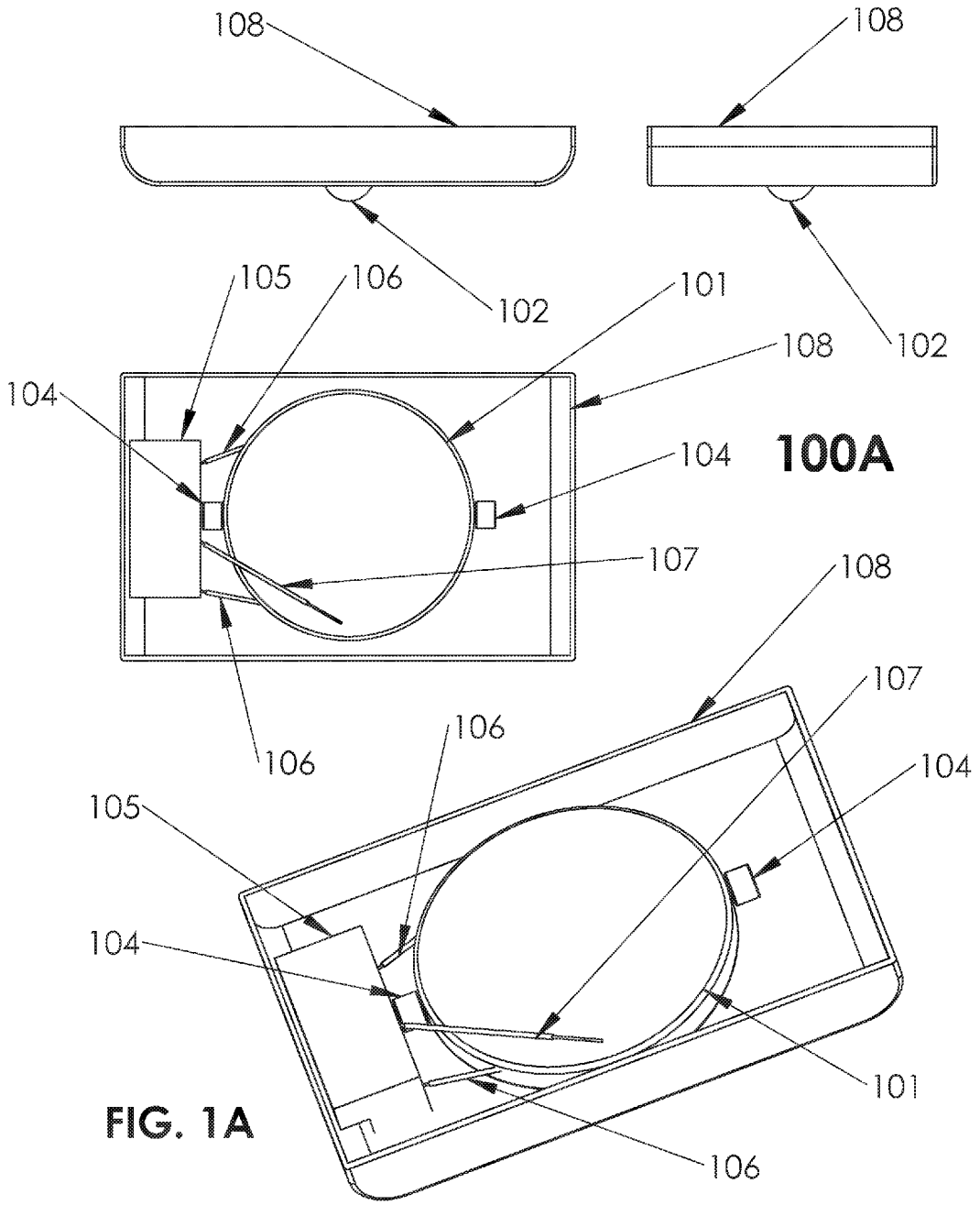
FIG. 1A shows a typical application of the present invention as a battery-less and wireless electrical switch with cover plate.

With reference to FIG. 1A there is shown the same, but enhanced with enclosure 108 embodiment 100A with a protective enclosure 108. Power connexion leads 106 are connected to said power load 105 and with this embodiment said power load 105 is said ISM band transceiver 105 with attached antennas 107.

Figure 2:
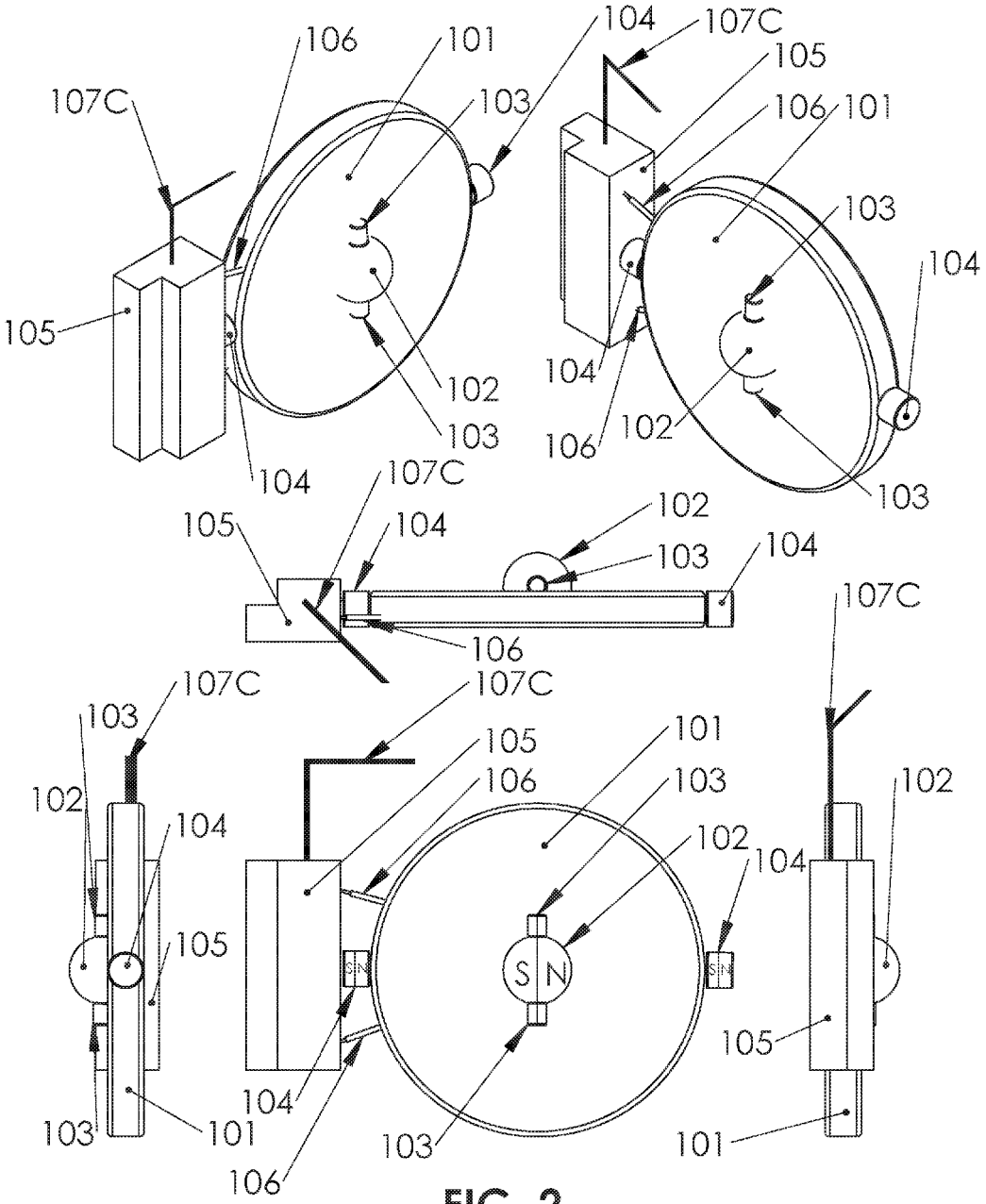
FIG. 2 is a multi perspective set of views for the present invention showing the polar alignment of the rotating and focusing magnets.

With reference to FIG. 2 a coil form 101 with its output power leads 106 are electrically connected and in communication with said power load 105, which in this illustrated embodiment is an ISM band radio transceiver 105 with associated antenna 107C. A spherical "centred axle" magnet 102 with axles for rotation 103 is positioned and in communication with the centre of said coil form 101. Said axial spherical "centred axle" magnet 102 is magnetized with its North and South magnetic poles perpendicular to its axle of rotation 103, and is at right angles to the coil-wire turns and parallel to the tangent of said coil-wire turns. The magnetic field lines emanating from the North magnetic pole and entering the South magnetic pole of said spherical magnet 102 will therefore be at right angles to said coil-wire sections that are parallel to said spherical magnet axle 103. Upon rotation of said spherical magnet means 102 about its axle 103, said magnetic field (visually assumed and not illustrated) lines cut through said coil form 101 and induces an electromotive force felt at the output leads 106. Said induced electromotive force is varying in intensity and polarity, thus generating an alternating electrical current utilized as a power source. In order to increase the amount of power produced by this action, a focus magnet 104 or a plurality of focus magnets 104 are positioned and in communication with said spherical "centred axle" magnet 102. Positioning of said focus magnets 104 are such that said focus magnet(s) 104 remain stationary with the South magnetic and North magnetic poles field lines that are aligned "inline parallel" to and in communication with said spherical magnet 102 field lines. This embodiment of the present invention allows for the action of concentration of said spherical magnet fields lines per unit square (area) so that more field lines cut through a coil-wire section thus producing more induced electromotive force (power). The amount of induced electromotive force is directly proportional to the number of lines per unit square (area).

Figure 3:
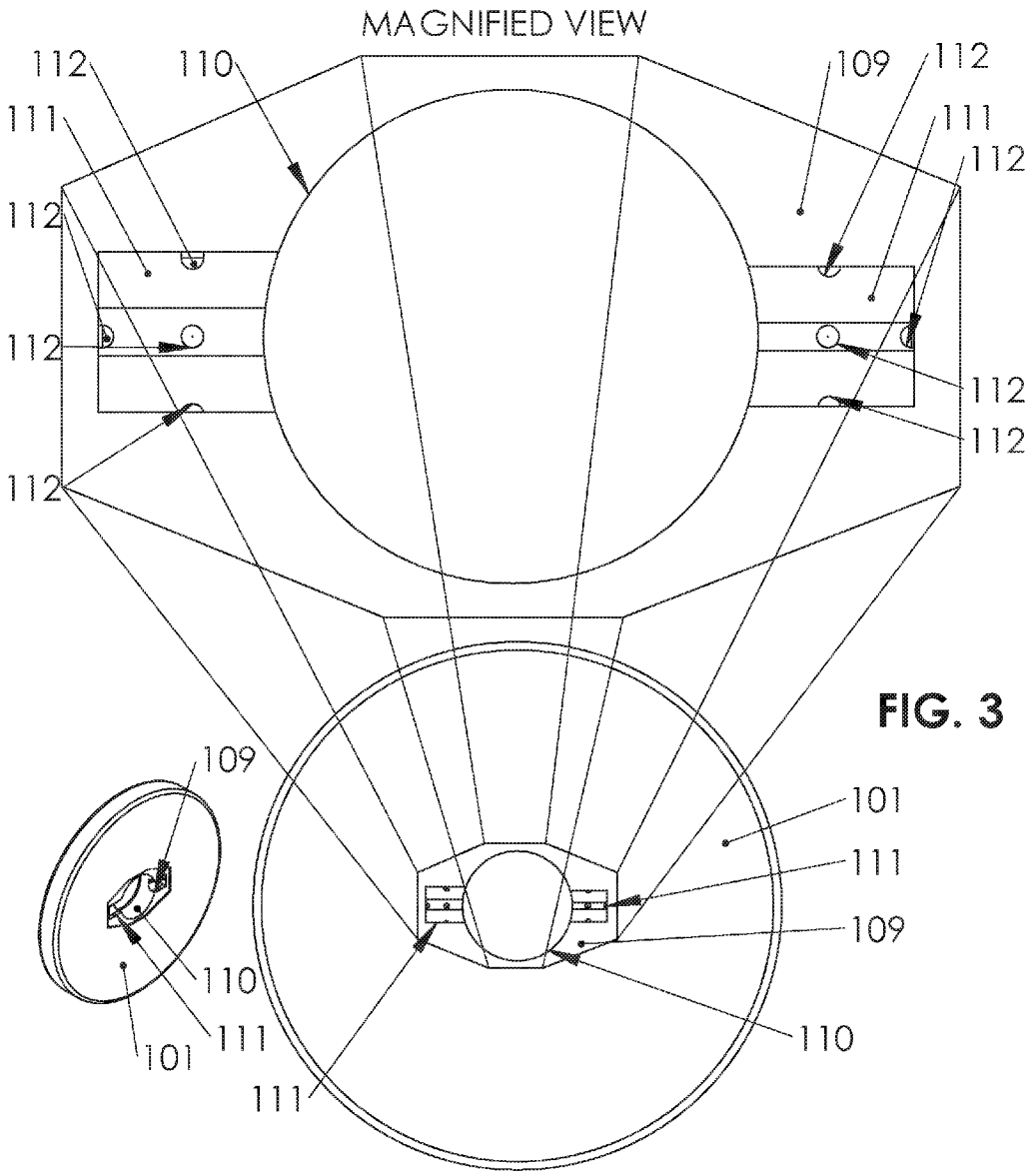
FIG. 3 shows a blown up view of the rotating magnet's seating position within the coil-wire form with a Topological "genus of one".

In FIG. 3 said coil-wire form with a Topological "genus of one" means is shown in an exploded view to further explain away the mounting of said spherical magnet 102 with its axle 103 that is in communication with recessed molded spherical magnet inset well 109 and cavity opening 110. Said axle 103 is mounted into a support well 111 that allows for a smooth movement of said axle 103 in the process of spherical magnet 102 rotation. Said rotation is further enhanced, for a minimum frictional mechanical impedance, by a plurality of unitized molded "standoff bearings" 112. The overall recessed molded spherical magnet inset well 109, is at coil-wire form 101 centre. Said position of spherical magnet is positioned and recessed midway in coil-wire form but is not limited to any alternative position arrangement method means.

Figure 4:
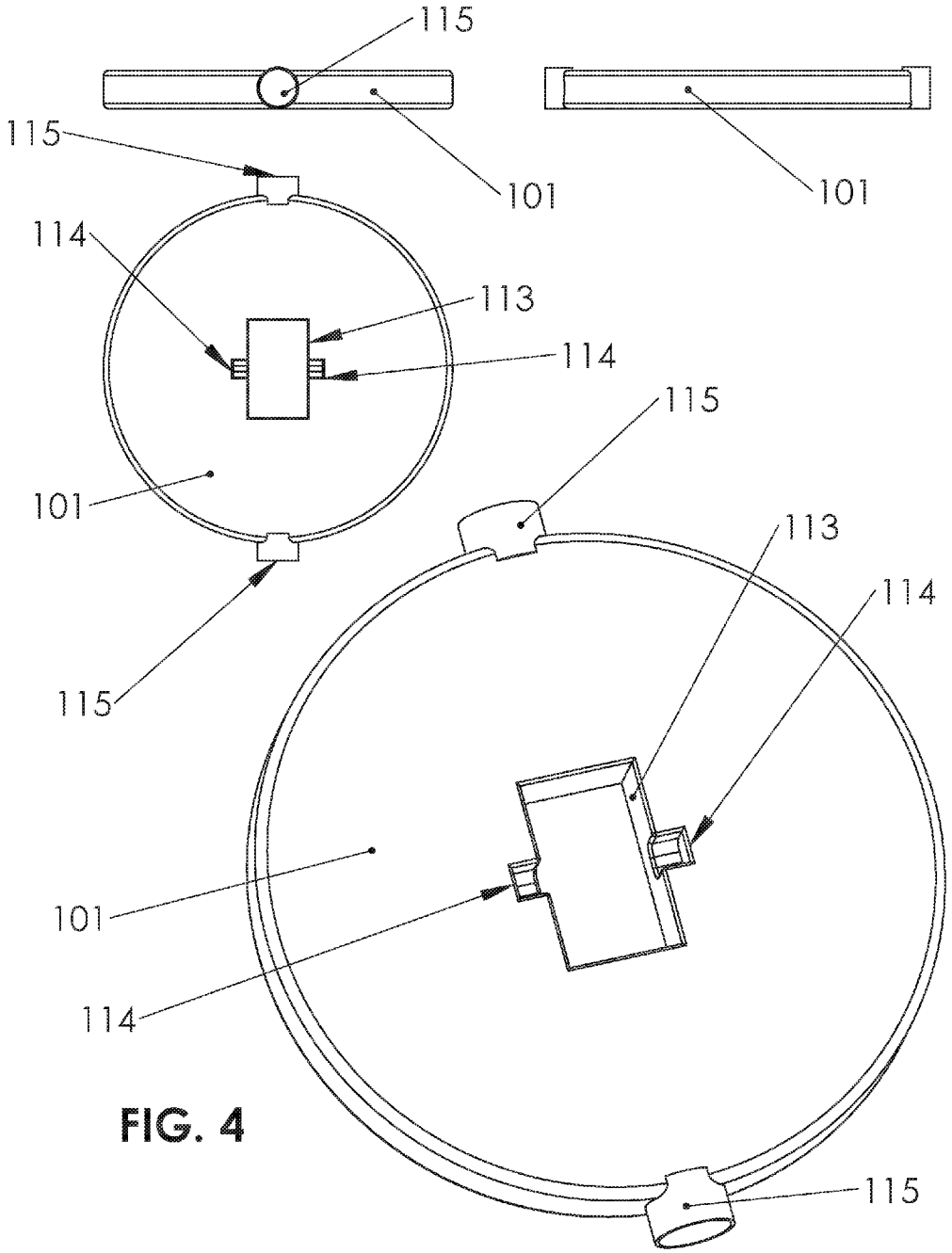
FIG. 4 shows another type of rotating magnet coil-wire form with a Topological "genus of one" not in the design to use a sphere, but in the form of a rotating wheel magnet device.

Another embodiment feature of the present invention is shown in FIG. 4, whereby an alternative to said coil-wire form's recessed molded spherical magnet inset well 109 of FIG. 3 is now embodied and shown in FIG. 4 with a four sided open cavity 113 to accommodate and be in communication with a non-spherical magnet means. Said non-spherical four sided "centred axle" magnet inset well 113 has axle inset wells 114 with same enhanced rotational molded "standoff bearings" as is shown in FIG. 3 for said spherical magnet embodiment. FIG. 4 also shows said focus magnet(s) 104 coil-wire form insert(s) 115 that holds stationary in position said focus magnet(s) on said coil-wire form 101.

Figure 5:
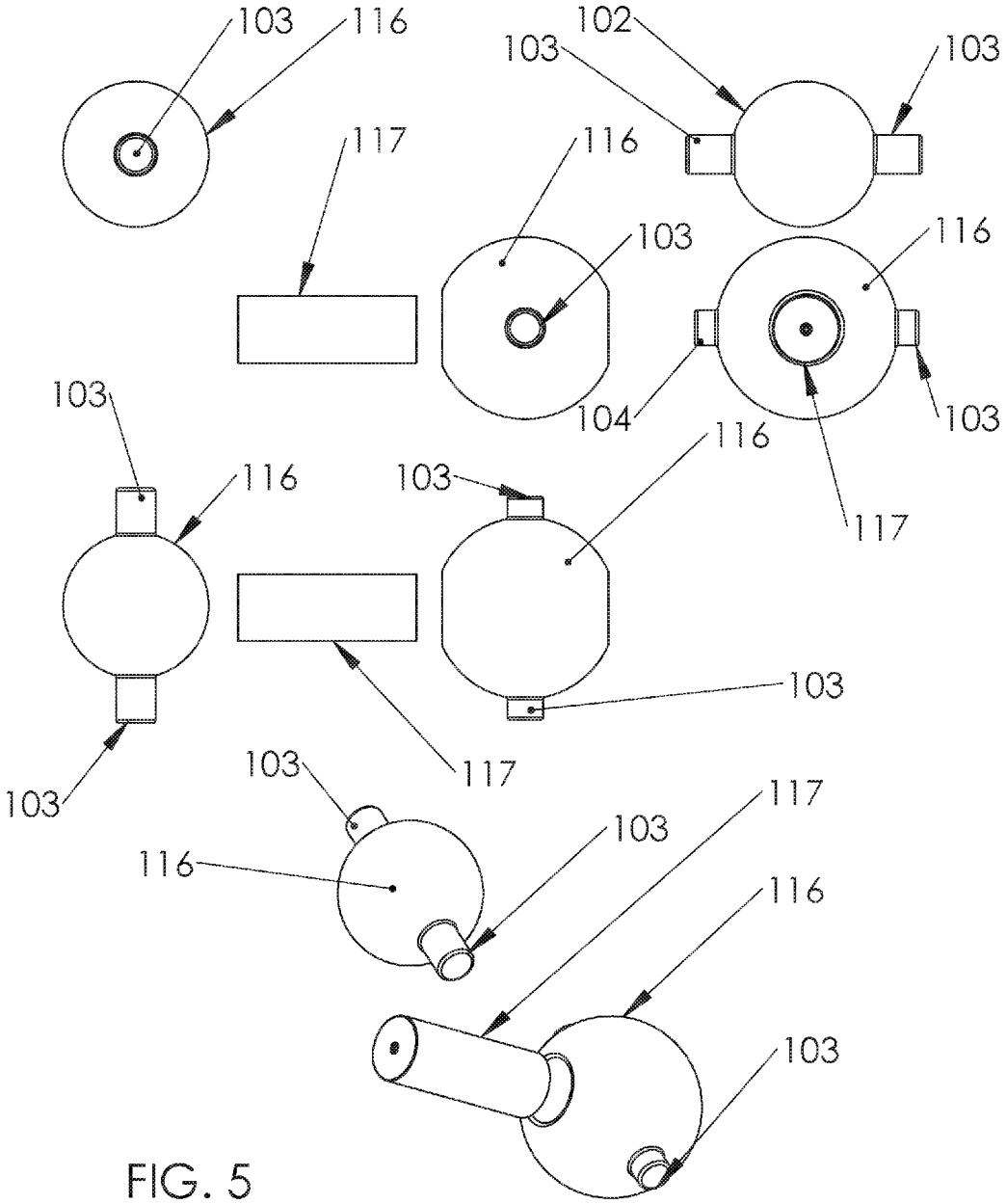
FIG. 5 shows a modified spherical magnet form with a Topological "genus of one" that is a non-magnetic material with a centered hole to insert a cylindrical bar magnet.

Another advantageous embodiment feature of the present invention is shown in FIG. 5, whereby said spherical "centred axle" magnet configuration means is replaced a modified model means for a spherical "centred axle" magnet equivalent comprising; a non-magnetic material "centred axle" sphere means with a Topological "genus of one" 116 and attached sub form non-magnetic material axle means 116A. A cavity "through hole" 116H exists in said spherical non-magnetic material means and is perpendicular to said non-magnetic material axle means 116A. A cylindrical magnet 117 is inserted in said cavity "through hole" 116H and is in communication with non-magnetic material means sphere 116, and further said cylindrical magnet 117 has its North and South magnetic poles at the opposite ends of said cylindrical shape means and thereby has its magnetic field lines of force perpendicular to said axle 116A axis. This embodiment of the present invention is implemented to serve as an economic alternative to an intrinsic "all metal" spherical "centred axle" magnet means and should be obvious to anyone steeped in the arts.

Figure 6:
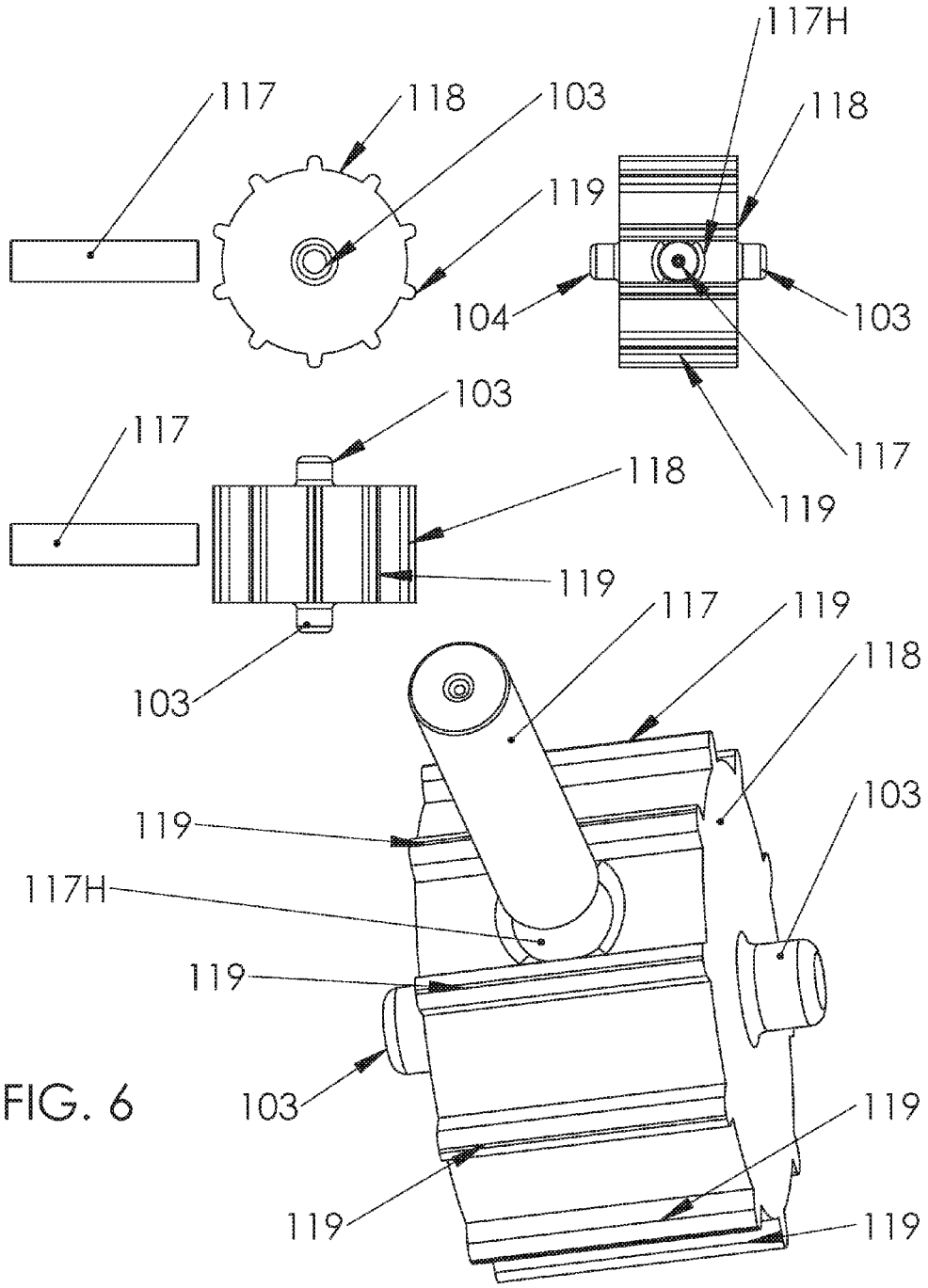
FIG. 6 shows perspective views of a modified non-metal rotatable wheel of Topological "genus of one" with a hole for insertion of a cylindrical bar magnet.

Another advantageous embodiment feature of the present invention is shown in FIG. 6, whereby a "centred axle" wheel 118 comprised of a non-magnetic material means with a Topological "genus of one" and having a planar plurality of serrations 119, whereby said serrations are utilized as an enhancement to rotational momentum, which should be obvious to anyone steeped in the arts. A cylindrical magnet 117 is inserted in said cavity "through hole" 117H and is in communication with non-magnetic material "centred axle" wheel means 118, and further said cylindrical magnet 117 has its North and South magnetic poles at the opposite ends of said cylindrical shape means and thereby has its magnetic field lines of force perpendicular to said axle 104 axis. This embodiment of the present invention is implemented to serve as an economic alternative to an intrinsic "all metal" serrated "centred axle" wheel magnet means and should be obvious to anyone steeped in the arts.

Figure 7:
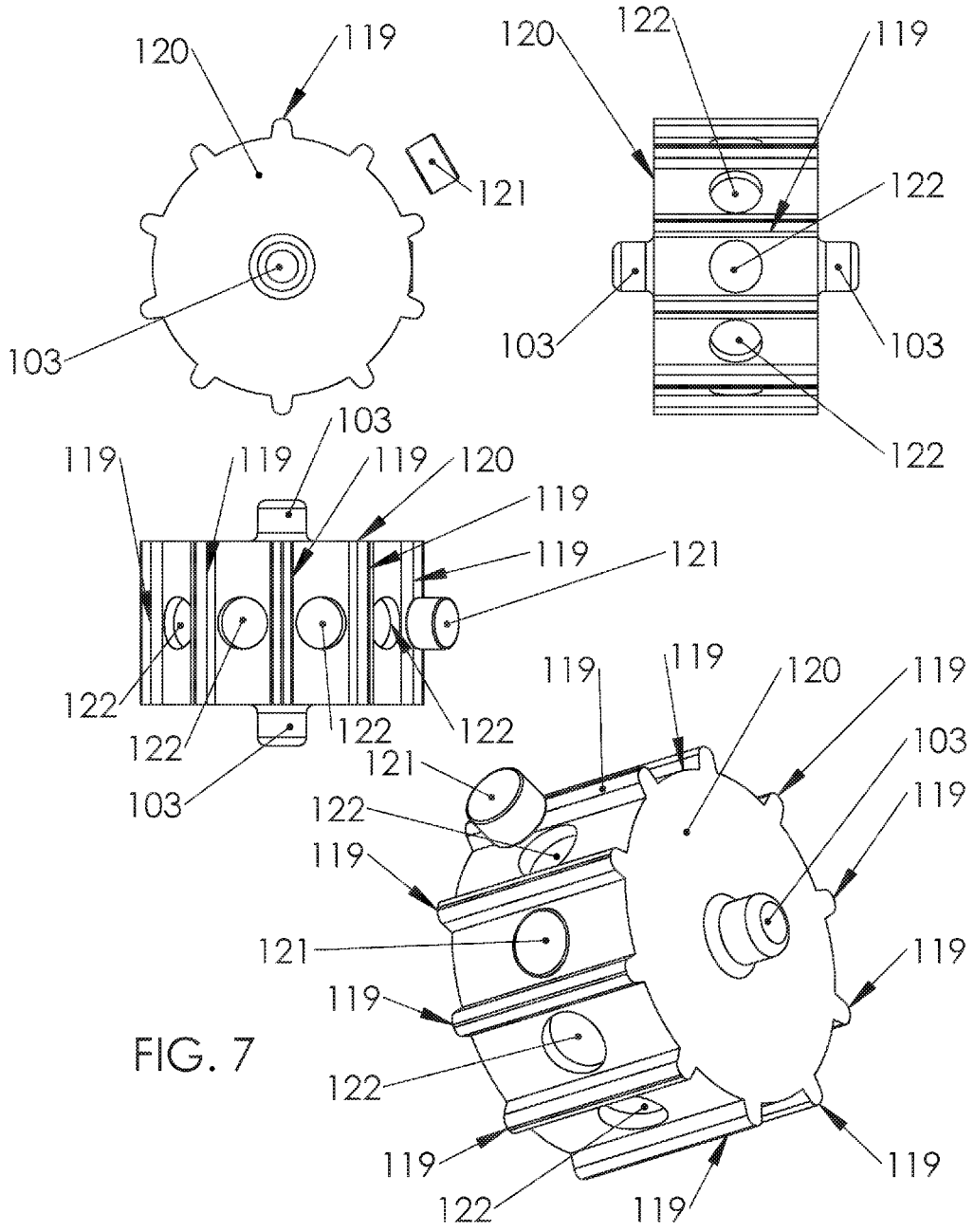
FIG. 7 shows perspective views of anon-metal magnet wheel of Topological "zeroth genus" comprised of a plurality of pill magnet insertions slots.

Another advantageous embodiment feature of the present invention is shown in FIG. 7, whereby a "centred axle" wheel with a Topological "zeroth genus" 120 comprised of a non-magnetic material means and having a planar plurality of serrations 119, whereby said serrations are utilized as an enhancement to rotational momentum, which should be obvious to anyone steeped in the arts. Adjacent to each serration 119 is a recessed "blind hole" 122, utilized to accommodate an be in communication with an inserted cylindrical magnet means 121 whose North and South poles are at opposite ends of said cylinder magnet means 121, and its magnetic field lines of force are perpendicular to the axle 104 axis. It should be obvious to anyone steeped in the arts that as said cylinder magnets 121 are rotated by said "centred axle" wheel 120 said magnets corresponding magnetic lines of force cut through said aforementioned coil-wire form 101 as shown in FIG. 4. Said "centred axle" serrated wheel is inserted in axle well 114 and is free to rotate through said four sided opening 113.

Figure 8:
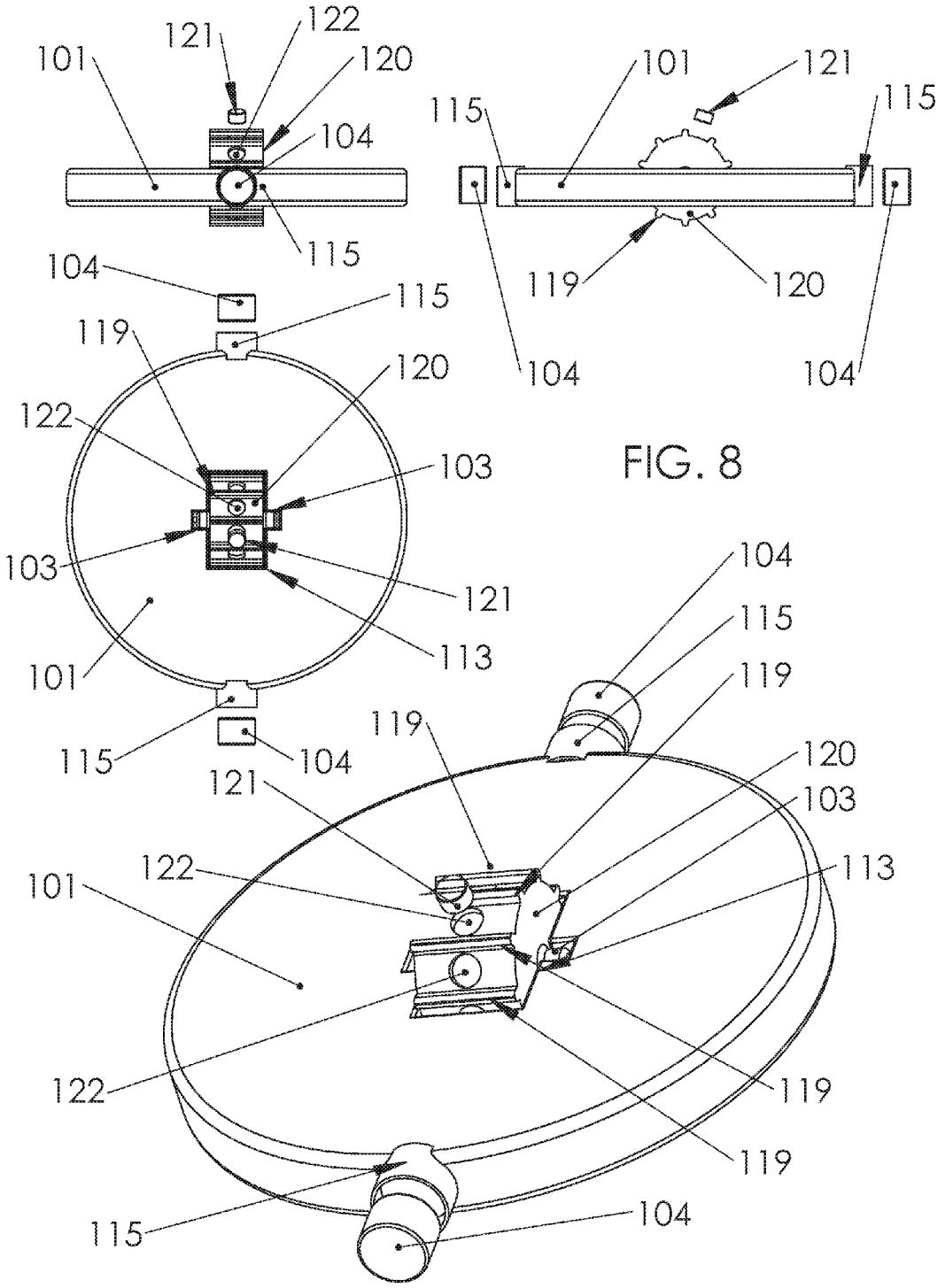
FIG. 8 shows an embodiment of the present invention with pill magnet wheel of Topological "zeroth genus" inserted into it slot in a coil-wire form of Topological "genus of one" with focusing magnets on opposite ends.

FIG. 8 illustrates the insertion of said "centred axle" wheel with a Topological "zeroth genus" 120 with an exploded view of said cylinder magnet means 121 parallel and tangent to inset well 122. Said "centred axle" wheel 120 is positioned in said four sided cavity opening 113, and as said wheel is rotated said plurality of cylinder magnets 121 move in a continuing circular path, with the perpendicular magnetic lines of force cutting through the coil-wire form and establishing an instant induced voltage for any useful purpose. Said focus magnet inset well(s) 115 hold stationary said focus magnet(s) 104 in place. Said "centred axle" serrated wheel 120 is inserted in axle well 114 and is free to rotate through said four sided opening 113.

Figure 9:
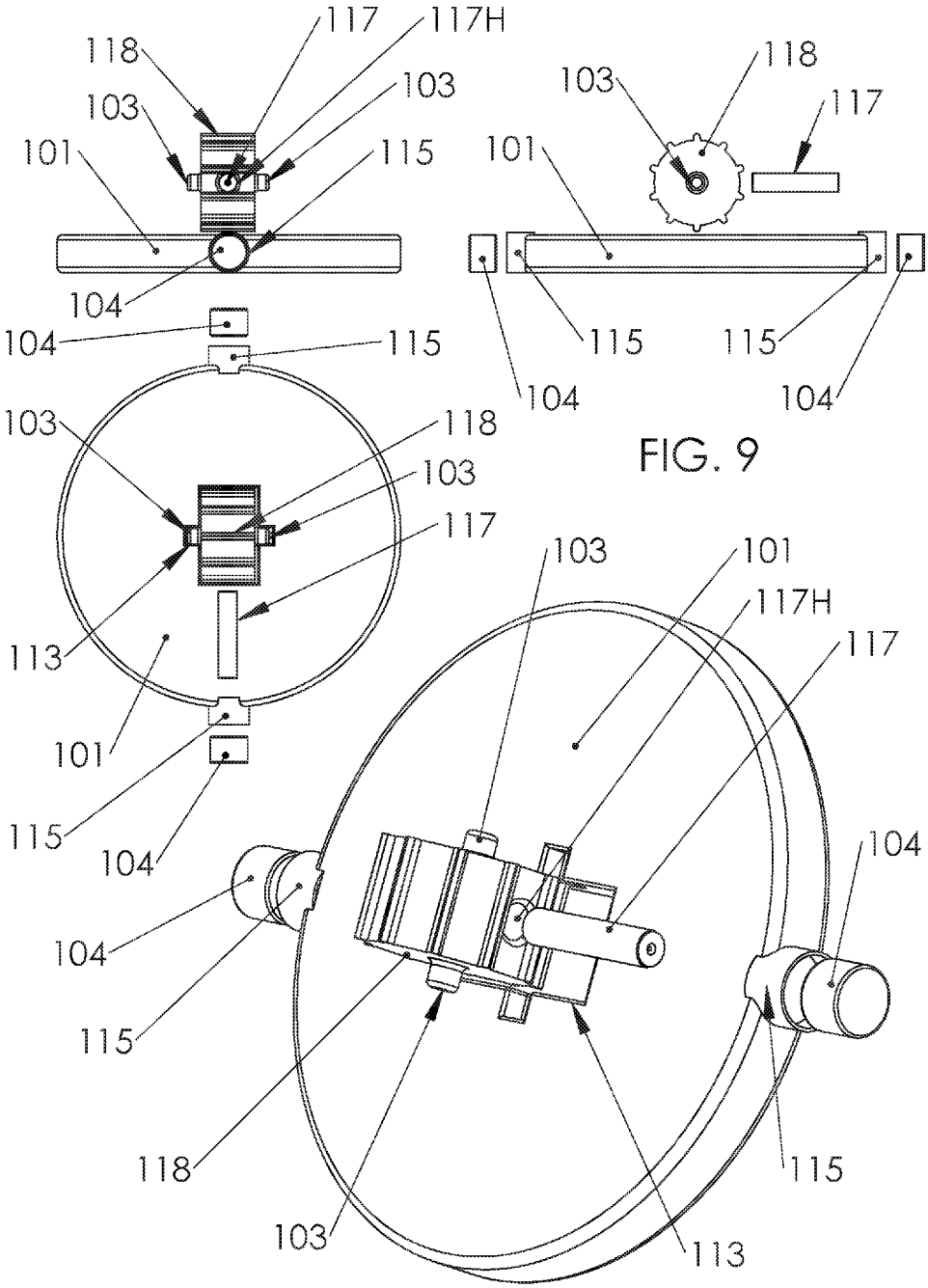
FIG. 9 shows more detail of the cylinder bar magnet wheel embodiment and illustrates that said wheel can be placed above the coil-wire form of Topological "genus of one".

FIG. 9 is an exploded multi-view of another advantageous embodiment of the present invention, whereby a "centred axle" wheel 118 designed with a single "centred through hole" that is perpendicular to said axle 103 and is of such diameter to accommodate an be in communication with a cylindrical magnet 117 and where cylindrical magnet 117 has its North and South poles at the end planes of said cylinder magnet 117. As said wheel 118 is rotated said cylinder magnet 117, contained within said "centred through hole," moves in a continuing circular path, with the perpendicular magnetic lines of force of said cylindrical magnet 117 cutting through the coil-wire form and establishing an instant induced voltage for any useful purpose. Said focus magnet inset well(s) 115 hold stationary said focus magnet(s) 104 in place. Said "centred axle" serrated wheel 118 is inserted in axle well 114 and is free to rotate through said four sided opening 113.

FIG. 10 graphically illustrates 1G the mathematical dot product of said stationary coil-wire form 101 and said rotational spherical magnet 102 or "centred axle" wheel 118 and 120 shown in previous figures above. The resultant value, which is a scalar quantity that indicates the reference North pole of the associated rotational magnet in question. Vector (A) represents said stationary coil-wire form 102 and Vector (B) represents the rotated North pole position of either;

said all magnetic rare earth (neodymium) spherical magnet 102, hybrid spherical magnet of non-magnetic material non-metal (polymer) sphere means 116 and insert cylinder magnet 117, non-magnetic material non-metal (polymer) "centred axle" serrated wheel 120 and a plurality of insert cylinder magnets 121, and non-magnetic material non-metal (polymer) "centred axle" serrated wheel 118 and insert cylinder magnet 117. Further illustrated 2G is the dot product of A and B that is C and the cross product of B and C represents the instantaneous value and polarity of the induced voltage from said interaction of a "centred rotating magnetic field" through said stationary coil-wire form 101.

Figure 11:
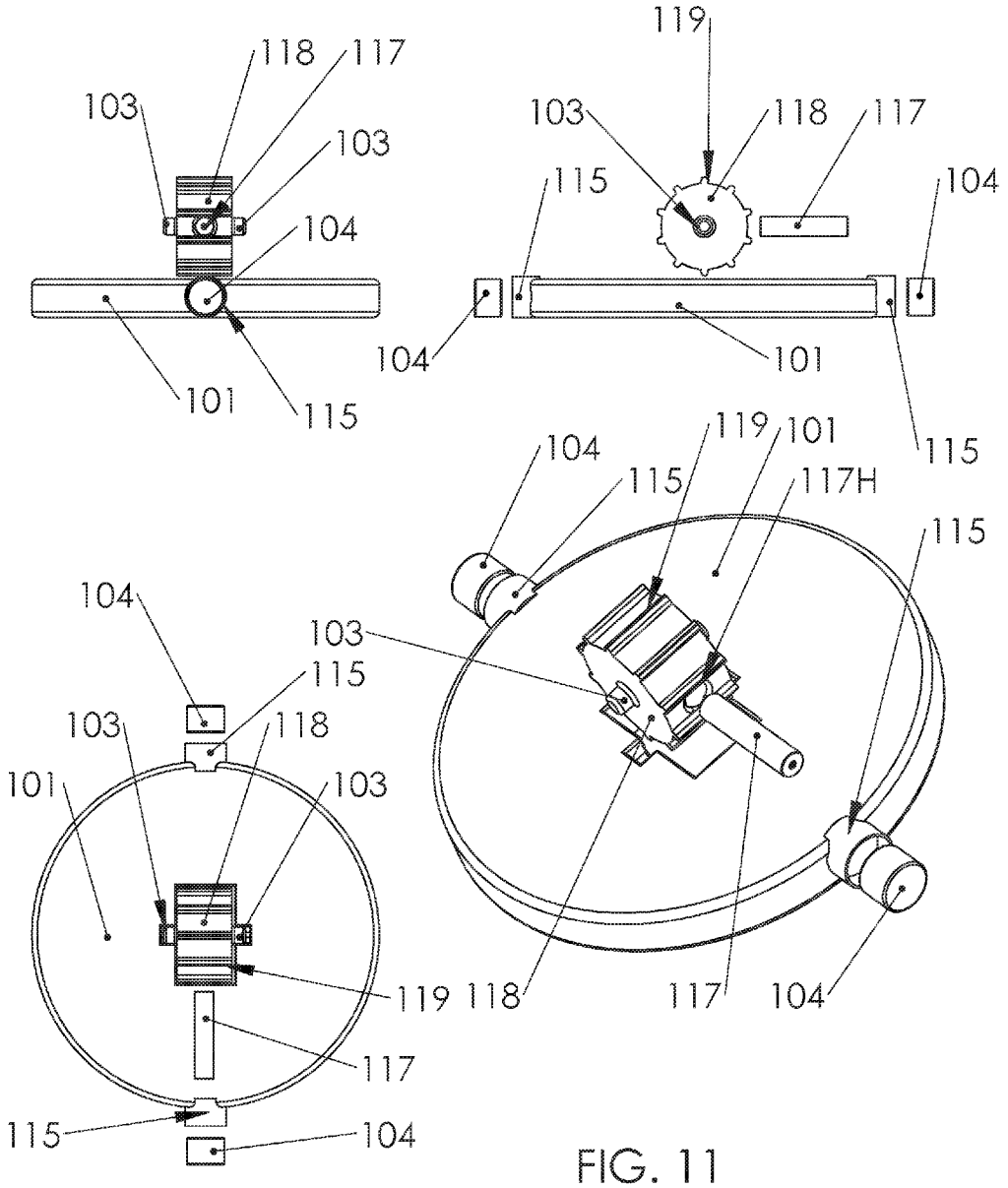
FIG. 11 is a four view of the generator assembly utilizing a wheel component means with a single cylindrical magnet.

In FIG. 11 an exploded view of the embodiment of utilizing a Topological "genus of one" serrated wheel 118 with a cylinder magnet 117 that is inserted into and in communication with said "centred through hole" 117H that is perpendicular to said axle 103, which is an extrusion of serrated wheel 118. Said serrated wheel 118 is inserted into four sided through hole 113 and is in communication with and free to rotate about its centre axis by axle 103, which is inserted into axle well 114 and is in communication with said axle well 114. Said magnetic field lines of cylinder magnet 117 are concentrated along the pole path of said cylinder magnet 117 by focus magnet(s) 104 inserted and in stationary communication focus magnet inset(s) 115.

Figure 12:
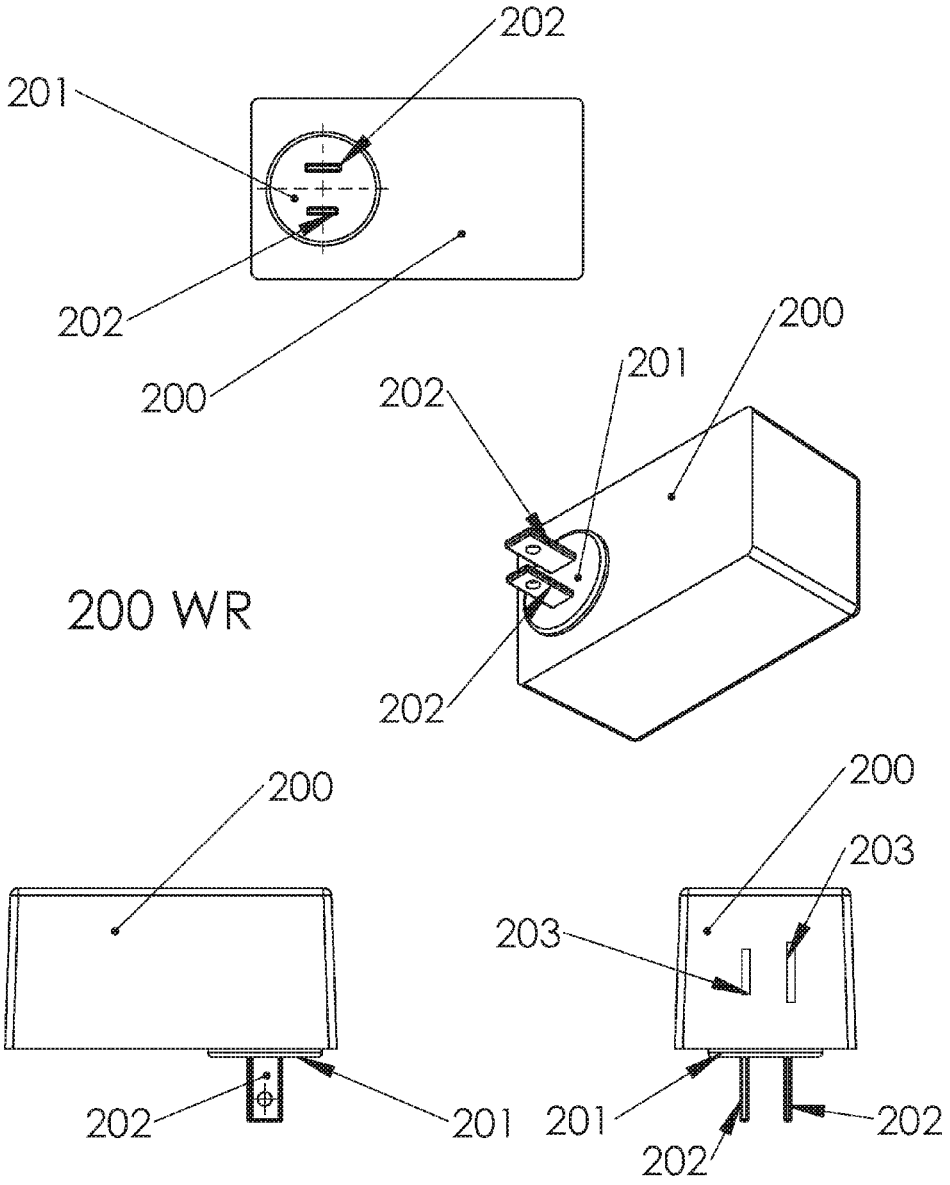
FIG. 12 is a drawing of a typical receiver means that is in communication with an AC power source and a control load.

FIG. 12 shows one embodiment of a wireless receiver system 200WR that has its electronic circuitry situated internal to enclosure 200. The operation of said receiver system 200WR is that said receiver system 200WR is powered by an AC power line voltage means and operates from either 120 or 240 VAC @50 or 60 hertz. Connexion to said power line means is by plug terminals 202 that are in communication with a female AC power line receptacle means. Said plug terminal base 201 that is in communication with plugs 202 can be removed and replaced with various plug terminals to fit foreign AC receptacles. Any AC load such as lights, motors, fans, or any reasonable AC load is plugged into and in communication with AC receptacle inserts 203. Said AC load that is plugged into and in communication with said receptacle 203 is then under the influence of electrical switching and dimming control of said receiver and electronic switching and dimming circuitry (not shown, but internal to enclosure 200) is in communication with said AC load to cause on/off switching and dimming of AC electrical power to load. Said wireless receiver 200WR receives its control command function from a remote battery-less and wireless transmitter 100A shown in FIG. 2. The action causing load control is by rotating any featured method means of;

said all magnetic rare earth (neodymium) spherical magnet 102, hybrid spherical magnet of non-magnetic material non-metal (polymer) sphere means 116 and insert cylinder magnet 117 combination in common communication with all, or said non-magnetic material non-metal (polymer) "centred axle" serrated wheel 120 and a plurality of insert cylinder magnets 121 combination in common communication with all, or said non-magnetic material non-metal (polymer) "centred axle" serrated wheel with a Topological "genus of one" 118 and insert cylinder magnet 117 combination in common communication with all.

Figure 13:
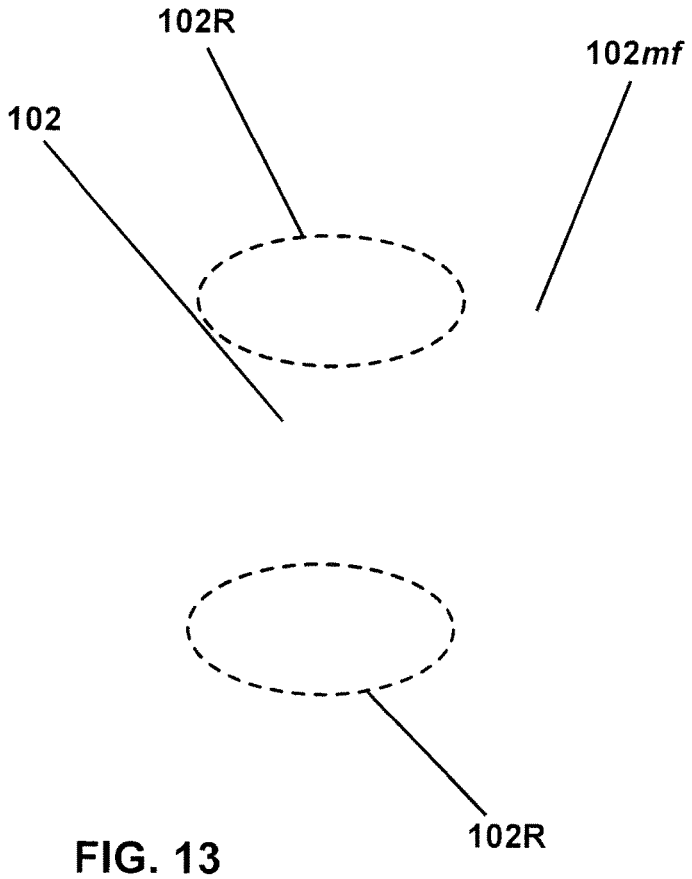
FIG. 13 is a magnetic field line plot of the surrounding magnetic field about a spherical magnet.

An illustration of FIG. 13 shows a typical intrinsic magnetic field embodiment 102mf surrounding a spherical permanent magnet 102. Said magnetic lines of force extend outward from the North magnetic pole and enter the South magnetic pole, whereby said magnetic field lines are concentrated at the pole volume 102R. Magnetic field lines of a cylinder magnet will have a similar magnetic line pole path and should be obvious to anyone steeped in the arts that field concentration is greatest at the magnetic poles of any magnet.

Figure 14:
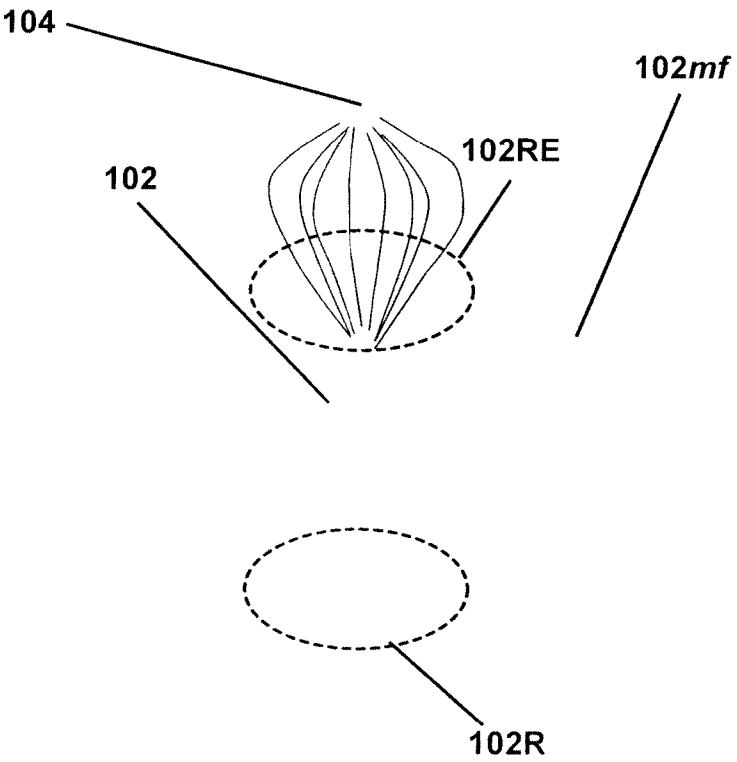
FIG. 14 is a magnetic field line plot of the surrounding magnetic field about a spherical magnet that is under the polar field concentration affects of a polar focusing magnet and its associated magnetic field.

FIG. 14 shows a magnetic field embodiment of a spherical permanent magnet 102 that is under the magnetic influence of an external cylindrical focus magnet 104. It should be obvious to anyone steeped in the arts that magnetic field intensity of influence varies to the inverse square of the distance from the magnetic pole in question. At the south pole of said spherical magnet 102 the field concentration 102R is intrinsic. At the opposite pole of spherical magnet 102 a cylinder magnet 104 is placed in close proximity of said spherical magnet 102 and is in commutative magnetic attractive pole communication. The action of placing a focus magnet 104 in close proximity to said spherical magnet 102 is to increase the number of magnetic field lines per unit area about a magnetic pole in question. As magnetic field lines (a.k.a. flux lines or flux) are increased, the amount of induced voltage in said coil-wire form 101 in FIG. 2 will increase as said spherical magnet 102 is rotated.

Another embodiment of said present invention as shown in FIG. 15 is for a flat (12 mm thick) wall type battery-less and wireless switch transmitter means 300 with a smooth wall or carry about enclosure 301 an having a rocker type flip mechanism means for switching on and off a remote AC electrical load such as a lighting fixture, but not limited to a lighting fixture.

Figure 16:
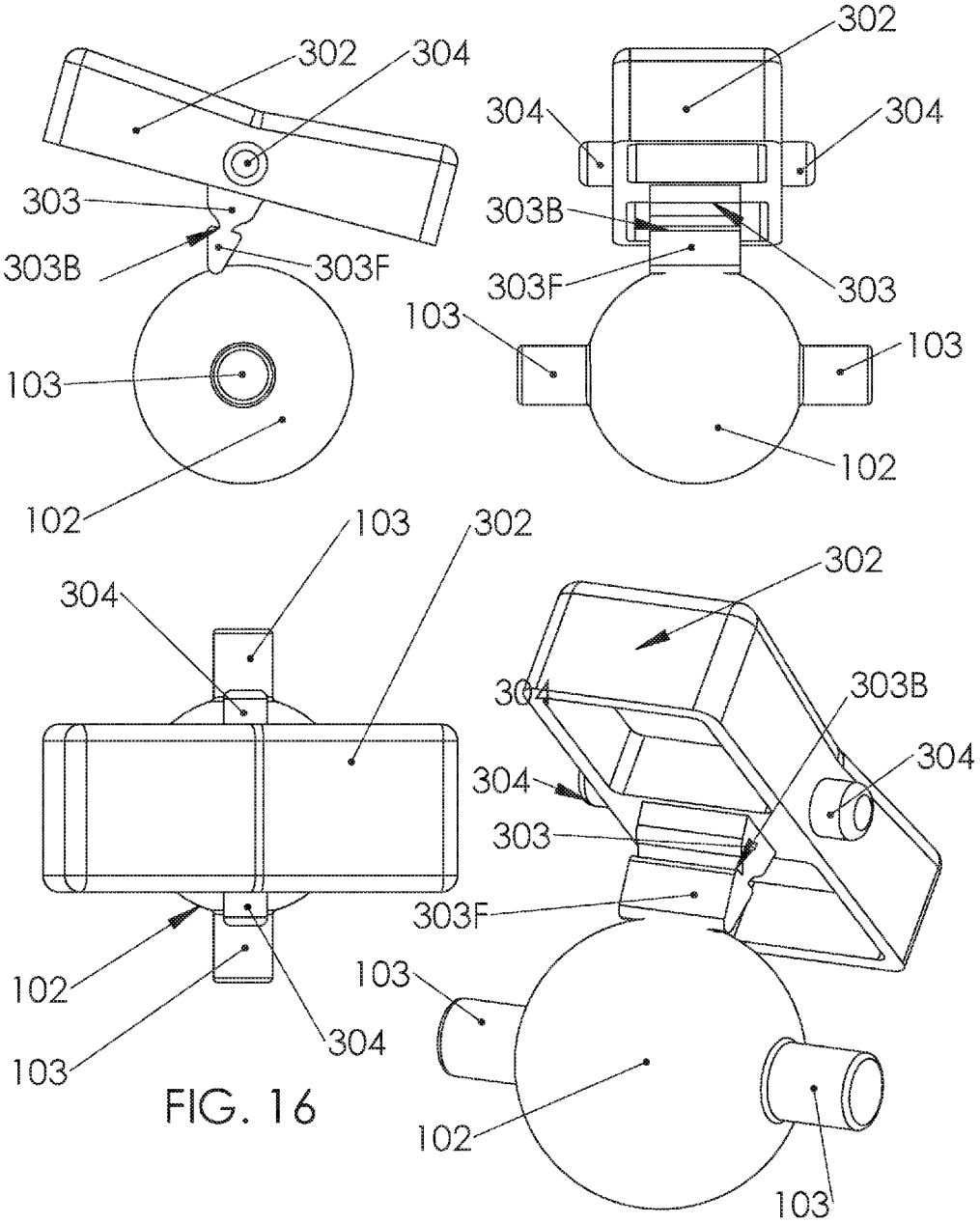
FIG. 16 is a perspective multi-view of a rocker style switch movement means; and illustrates the flip finger mechanism means for rotational movement of a spherical magnet.

Another embodiment in FIG. 16 is a detailed multi-view of a rocker-rotator method means 302 in communication with its extruded planar perpendicular axle 304 that is in communication with and utilizes a soft and flexible polymer flip finger method means 303, 303B, and 303F to initiate and promote rotation of a spherical magnet method means 102 about its centred axle 103 axis. Said flexible flip finger base 303 is in communication with bending notch 303B and flip finger 303F and upon an operator pushing (pressing) said rocker method means 302 and its consequent flip movement about its axle 304 axis, said flip finger 303F that is in communication with spherical magnet 102 will cause a reaction to spherical magnet and initiate rotation of said spherical magnet in a cyclical direction opposite to the push force direction applied to said rocker 302; likewise the converse action takes place with the opposite side of said rocker 302 is pushed. After said flip finger 303F ends mechanical communication with said spherical magnet 102, said spherical magnet is free to spin for a goodly number of cycles before ceasing rotation due to natural damping frictional forces. This action of said present invention produces enough power from a single flip to generate a voltage level sufficient for several seconds; ample time to power a micro transmitter and send a large amount of encoded digital data to a remote receiver that decodes said data received.

Figure 17:
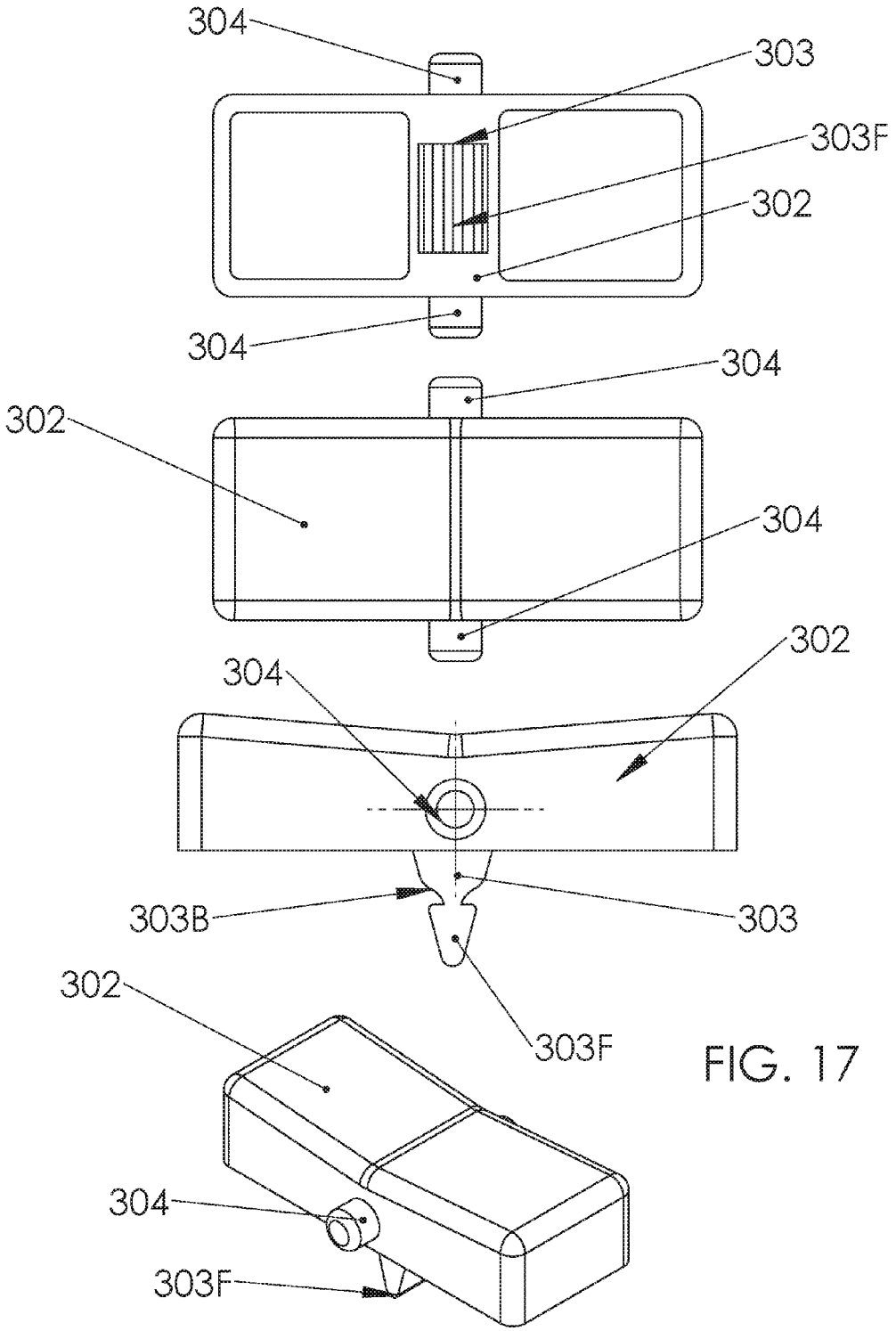
FIG. 17 is a perspective multi-view of the rocker mechanism means with its moveable flip finger mechanism means.

Another embodiment in FIG. 17 shows said rocker 302 that is in communication with its flip finger base 303, its flip finger 303F and said flip finger 303F is bendable in a forward or backward direction by flexible notch section 303B.

Figure 18:
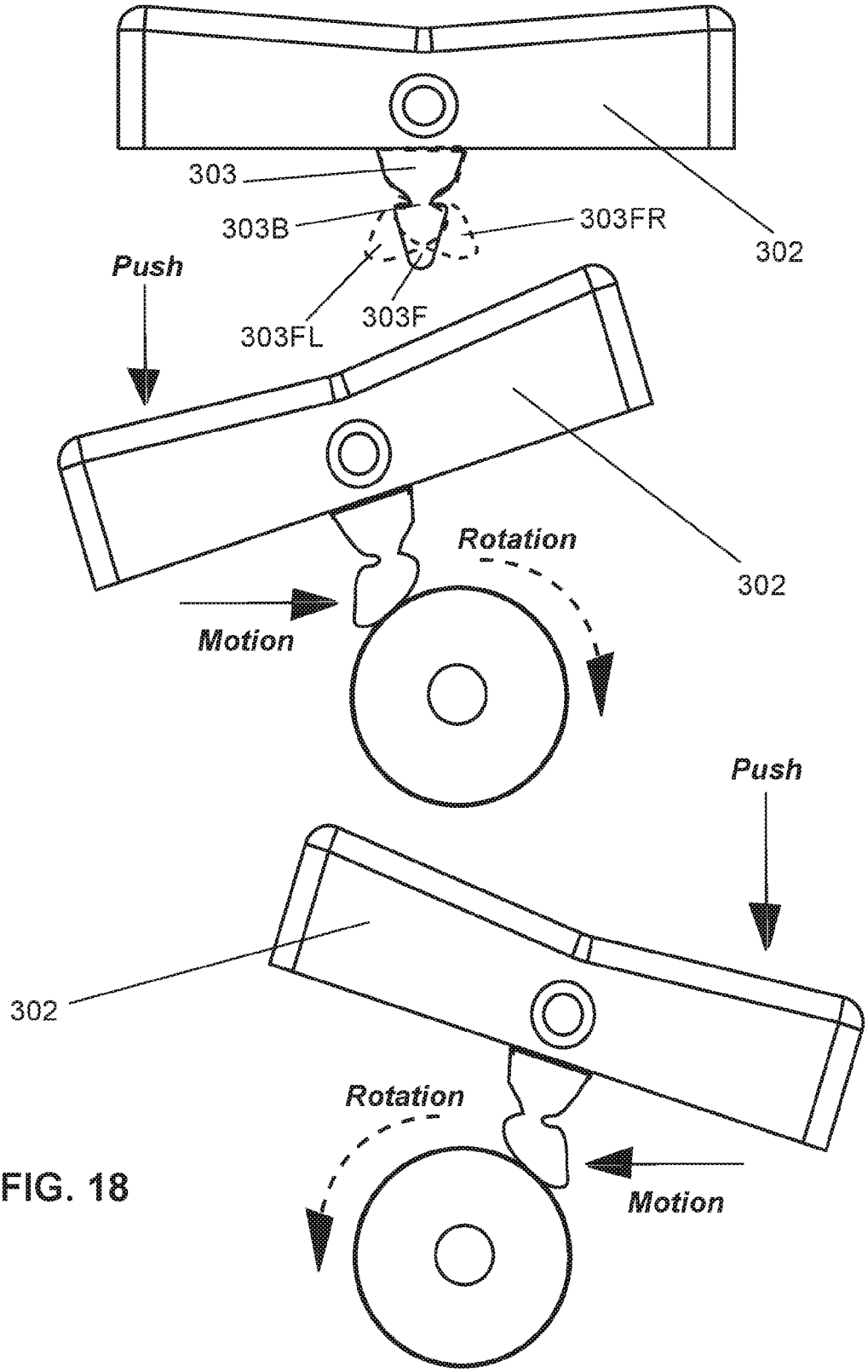
FIG. 18 shows a "progressive movement" illustration of the rocker flip finger mechanism means for rotating a spherical magnet about its designated axis of rotation.

The embodiment of said rocker means 302 in FIG. 18 shows the action of switch activation by pushing the left side of said rocker means 302 that is in communication with flip finger base 303 and whose flip finger means 303F is in flexible communication with spherical magnet 102. Further, pushing the rocker causes a bending around finger notch 303B and moves flip finger means 303F to move on a leftward position 303FL thus establishing a thrust force on said spherical magnet 102 causing a clockwise rotation of said spherical magnet. Conversely, the embodiment of said rocker means 302 in FIG. 18 shows the action of switch activation by pushing the right side of said rocker means 302 that is in communication with flip finger base 303 and whose flip finger means 303F is in flexible communication with spherical magnet 102. Further, pushing the rocker causes a bending around finger notch 303B and moves flip finger means 303F to move on a rightward position 303FR thus establishing a thrust force on said spherical magnet 102 causing an anticlockwise rotation of said spherical magnet.

Figure 19:
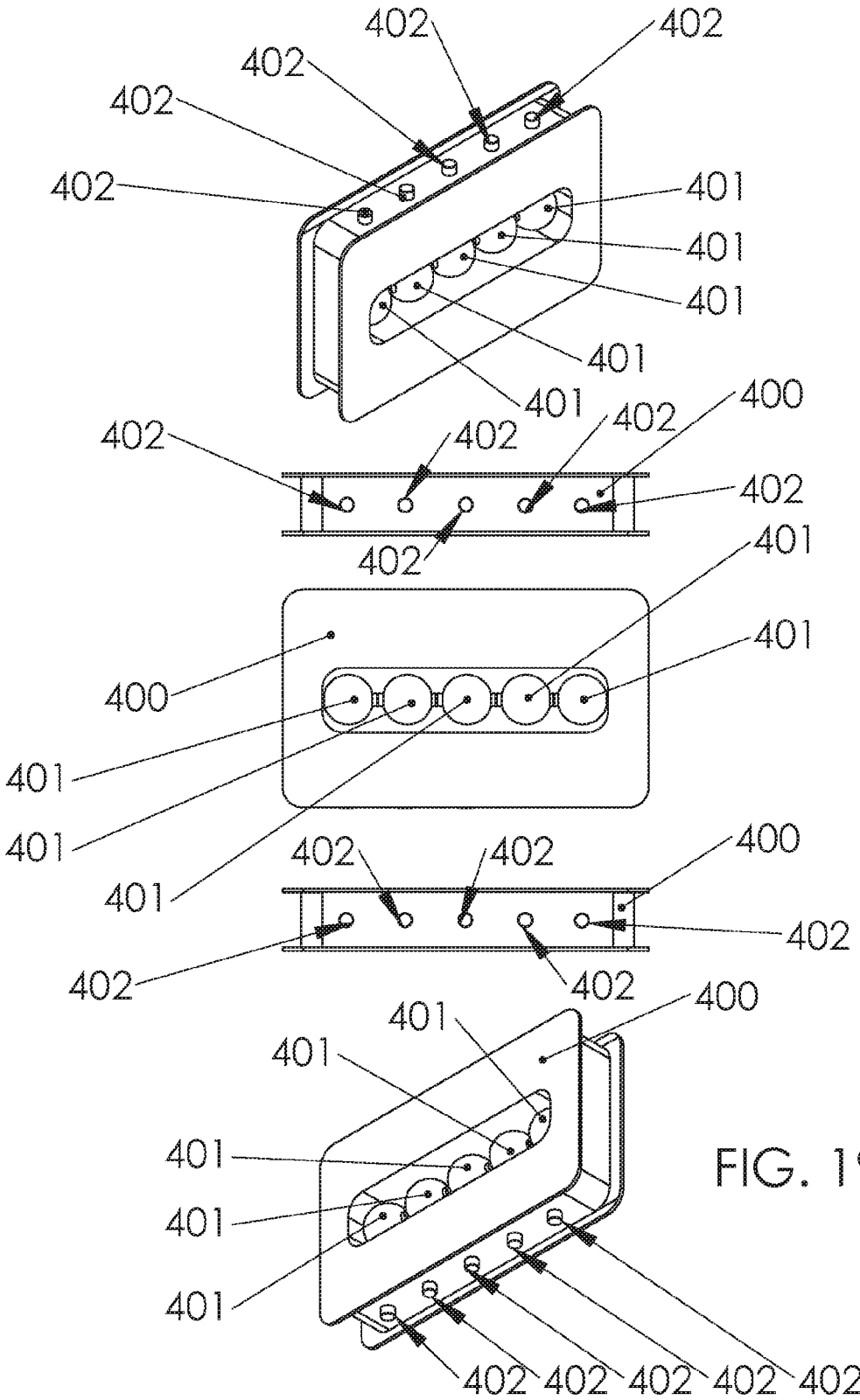
FIG. 19 is an example of utilizing a plurality of spherical magnets that are arranged in-line with their respective North and South magnetic poles parallel synchronized where each spherical magnet has at least one or a plurality of focus magnets. Said plurality of spherical magnets are disposed and in communication with a rectangular coil-wire form of Topological "genus of one", but not limited to a rectangular coil-wire form shape.

Another embodiment of the present invention in FIG. 19 utilizes a rectangular shape coil-wire form 400 that is of a Topological genus of one, whereby a centred through hole exists for free movement of rotation of a plurality of spherical permanent magnets 401, and existing about the side of said rectangular coil-wire form is disposed a dual series plurality of focus magnet means 402. Each said focus magnet pair 402 have their magnetic lines of force in-line and disposed in an attractive state relative to each one of said plurality of spherical permanent magnets 401.

Figure 20:
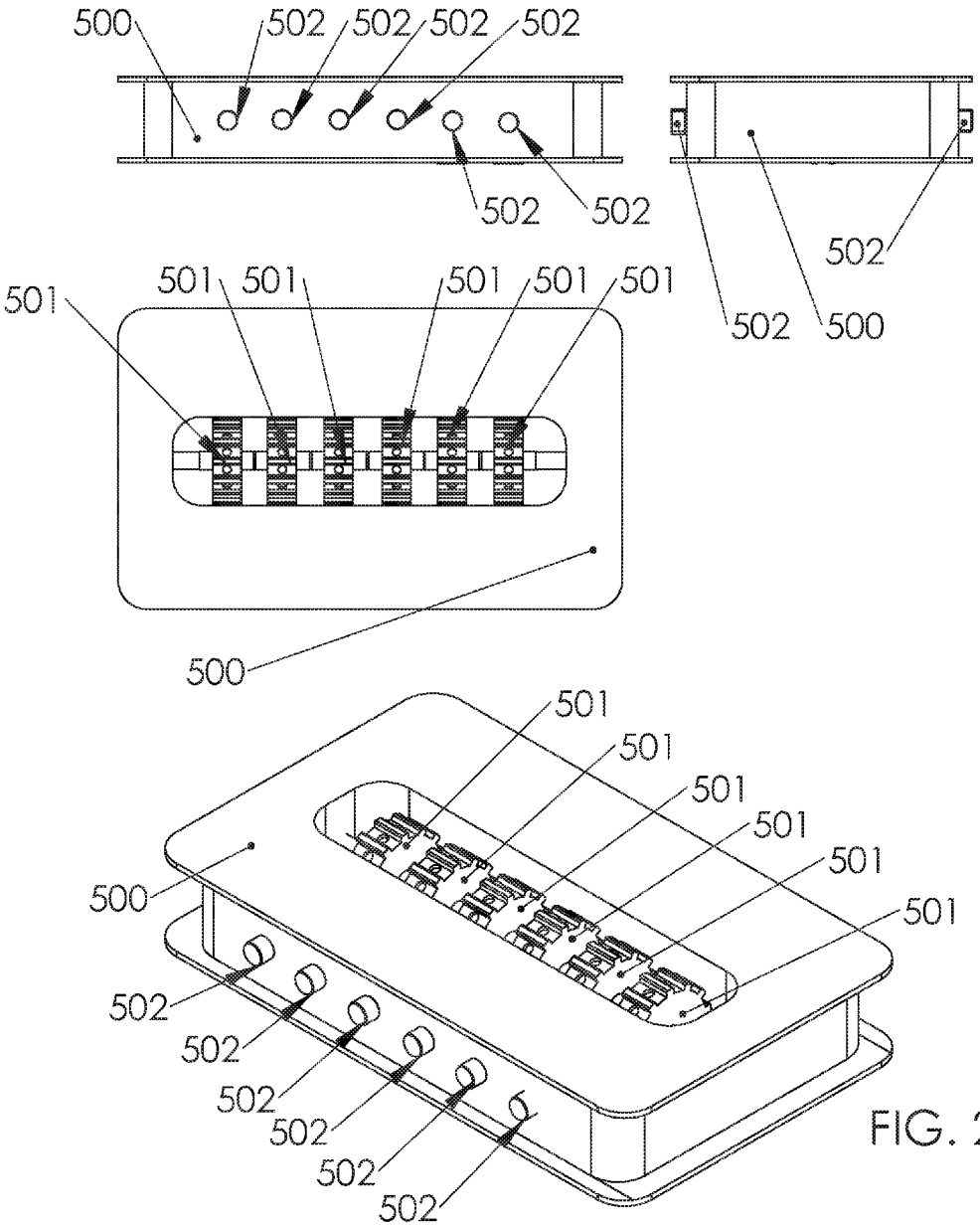
FIG. 20 is an example embodiment of utilizing a plurality of serrated wheels where each wheel having disposed a plurality of centred cylindrical permanent magnets that are arranged in-line with their respective North and South magnetic poles parallel synchronized where each plurality of serrated wheel magnets has at least one or a plurality of focus magnets. Said plurality of serrated wheel magnets are disposed and in communication with a rectangular coil-wire form of Topological "genus of one", but not limited to a rectangular coil-wire form shape.

Another embodiment of the present invention in FIG. 20 utilizes a rectangular shape coil-wire form 500 that is of a Topological genus of one, whereby a centred through hole exists for free movement of rotation of a plurality of serrated wheels 501, and existing about the side of said rectangular coil-wire form is disposed a dual series plurality of focus magnet means 502. Each said focus magnet pair 502 have their magnetic lines of force in-line and disposed in an attractive state relative to each one of said plurality of serrated wheels that can be of a Topological "zeroth genus"

with a plurality of centred blind hole insets on a serrated wheel to accommodate a plurality of cylindrical magnets 121.

Figure 21:
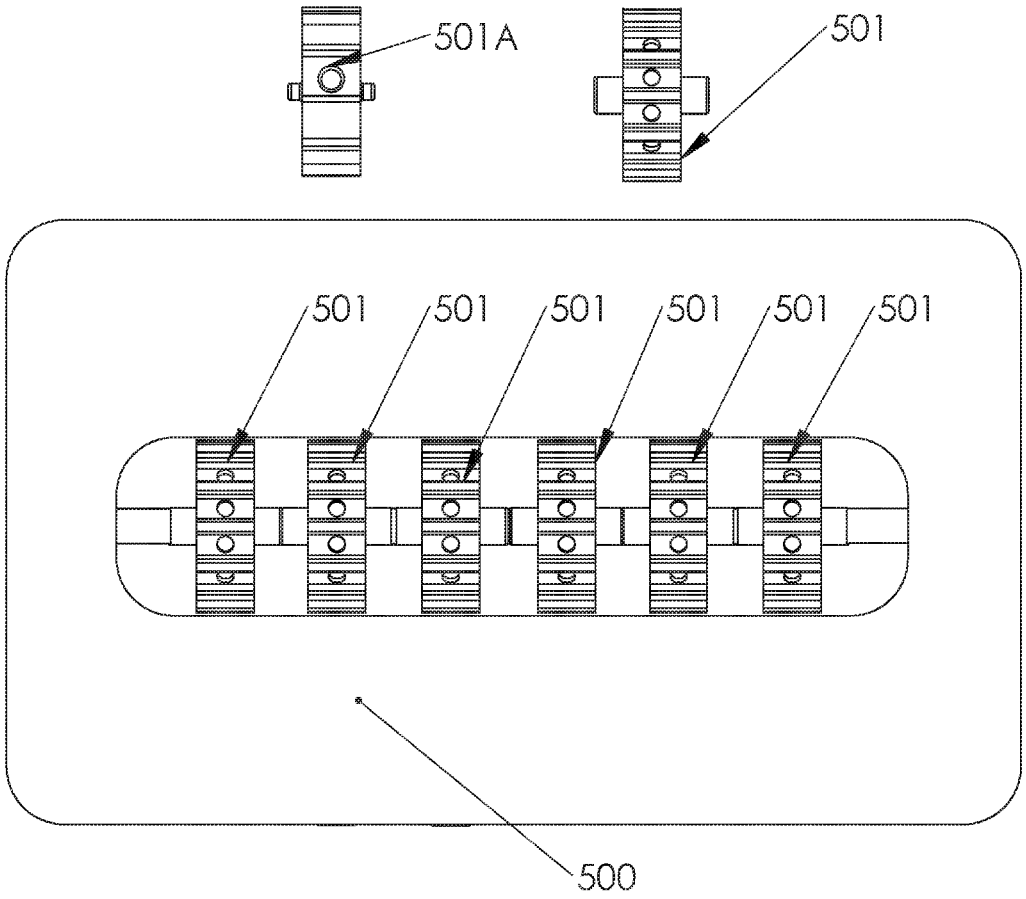
FIG. 21 shows an embodiment of a serrated wheel generator with said rectangular coil-wire form and an array of serrated wheels all in-line and can be of type where the Topological genus of one utilized a disposed cylindrical permanent magnet or an array of serrated wheels all in-line and can be of type where a Topological zeroth genus serrated wheel utilizes a plurality of disposed cylindrical permanent magnets that are inserted into a series of blind holes.

Another embodiment of the present invention in FIG. 21 utilizes a rectangular shape coil-wire form 500 that is of a Topological genus of one, whereby a centred through hole exists for free movement of rotation of a plurality of serrated wheels 501, and existing about the side of said rectangular coil-wire form is disposed a dual series plurality of focus magnet means 502 (not visible in drawing). Each said focus magnet pair 502 (not visible in drawing) have their magnetic lines of force in-line and disposed in an attractive state relative to each one of said plurality of serrated wheels 501 that can be of a Topological "zeroth genus" with a plurality of centred blind hole insets on a serrated wheel to accommodate a plurality of cylindrical magnets 121, or each said focus magnet pair 502 (not visible in drawing) have their magnetic lines of force in-line and disposed in an attractive state relative to each one of said plurality of serrated wheels 501A that can be of a Topological "genus one" and each with a centred through hole on a serrated wheel to accommodate a single cylindrical permanent magnet 117.

Figure 22:
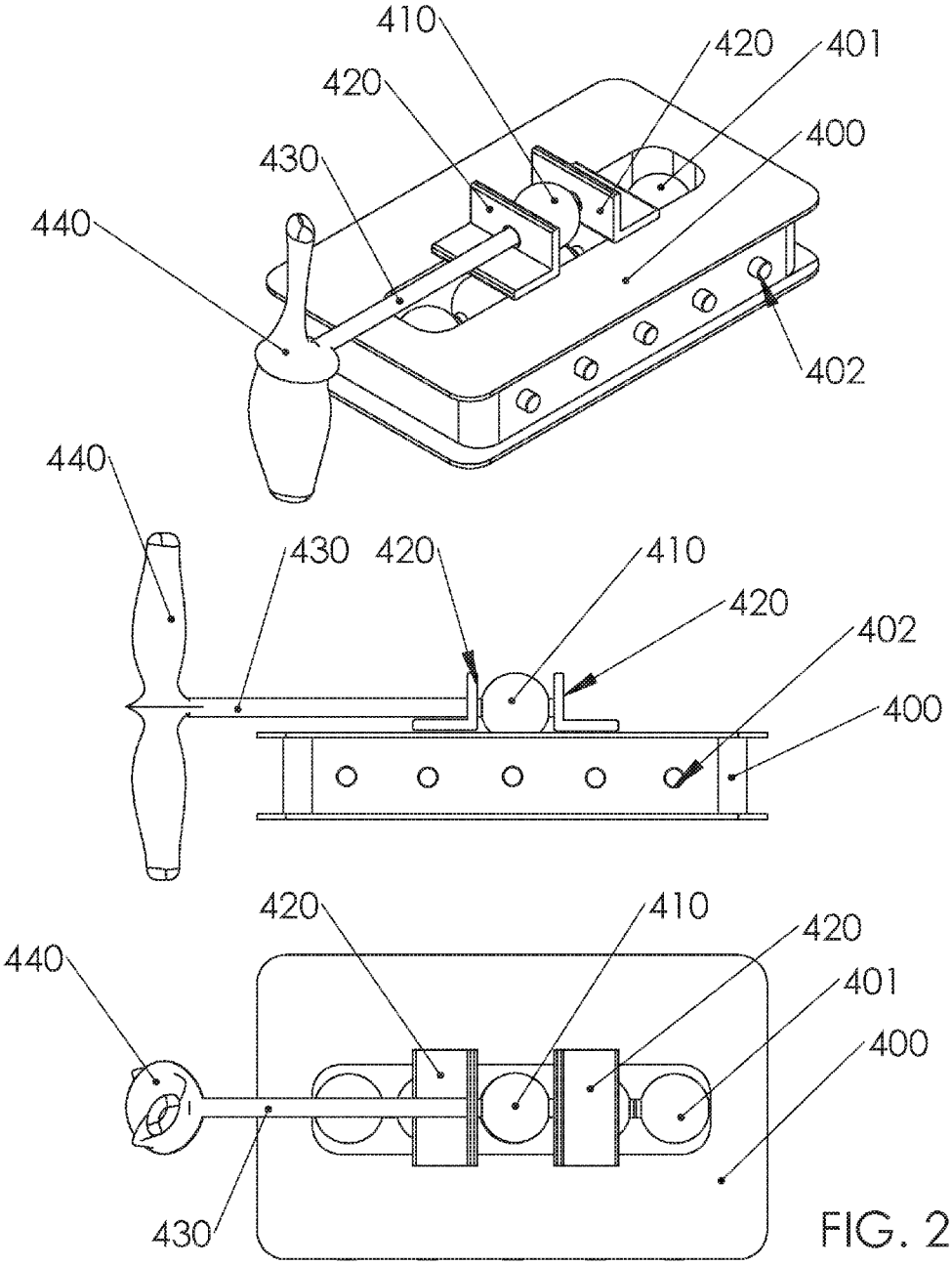
FIG. 22 is another embodiment of the present invention where a drive mechanism in the form of a spherical magnet is disposed over a central disposed generator magnet and where said drive mechanism is in communication with a drive shaft that is in communication with a propeller that is rotated in ambient wind activated air said propeller rotates drive shaft and drive shaft is in communication with said drive mechanism spherical magnet that is in communication with said generator spherical magnet that rotates, and said propeller is utilized as the action means for causing system rotation to generate electrical power.

Another embodiment of the present invention in FIG. 22 where a 360 degrees of freedom rotatable propeller 440 is in communication with a 360 degrees of freedom rotatable drive shaft 430 that is in turn in communication with a 360 degrees of freedom rotatable Gaussian spherical form drive gear 410 having two axles that are supported by two stationary mounting brackets 420 where at least one axle component is in communication with said drive shaft 430 and the remaining axle is in communication with mounting bracket 420.

Figure 23:
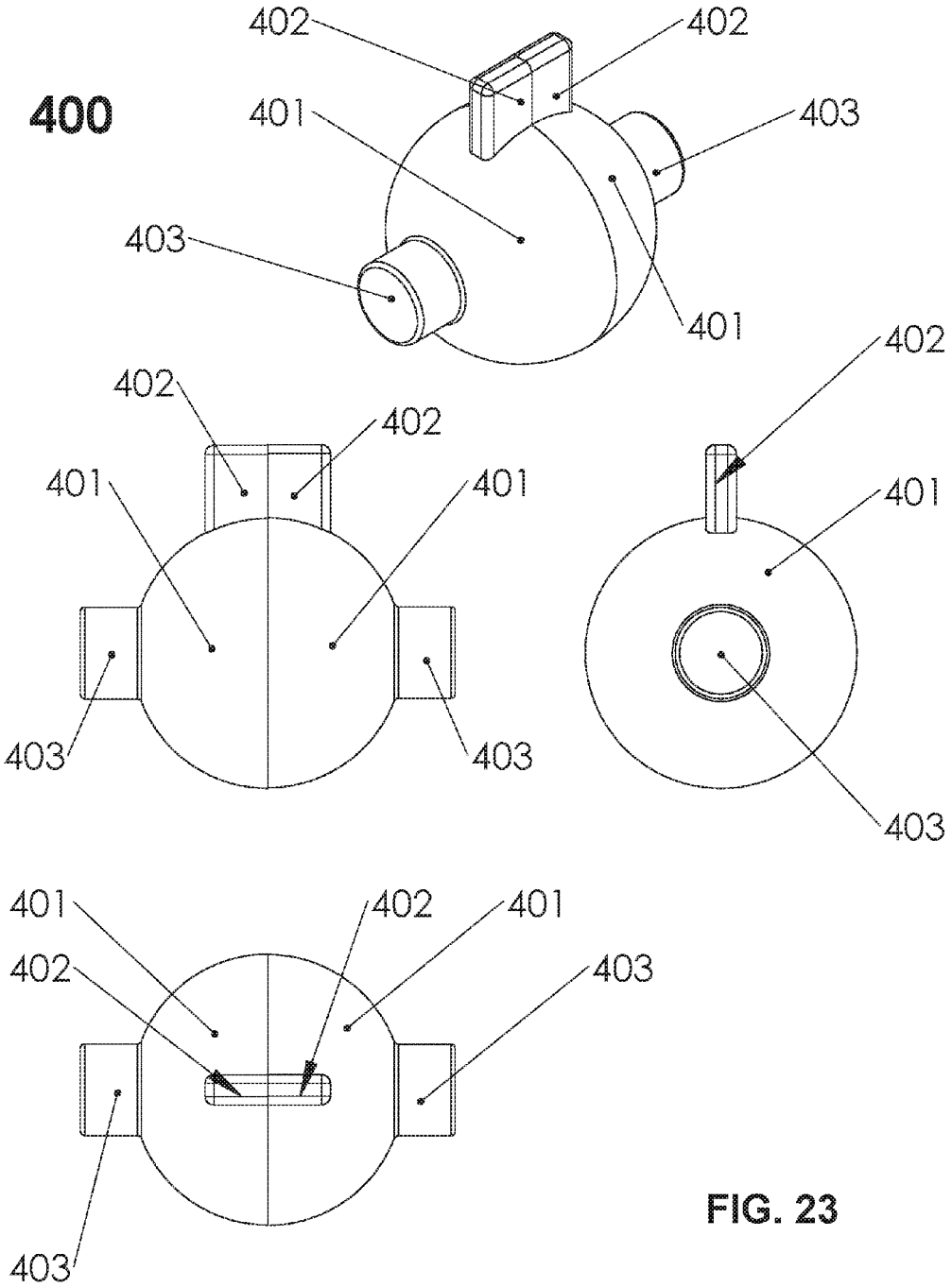
FIG. 23 is an illustration of spherical magnet cap enclosure with flip tab and axial components, said enclosure is comprised of two identical halves.

A separate embodiment associated with the present invention in FIG. 23 of an axial encapsulation tabbed magnet shell 400 that is comprised of two halves, where each half shell component has a hollow hemisphere 401 with a tangent protruding axle means 403 and a flip tab half 402 tangent to the hemisphere 401 and positioned at its outer rim; and when said two halves are combined, they form a complete hollow encapsulation means 400 for enclosing a spherical permanent magnet.

Figure 24:
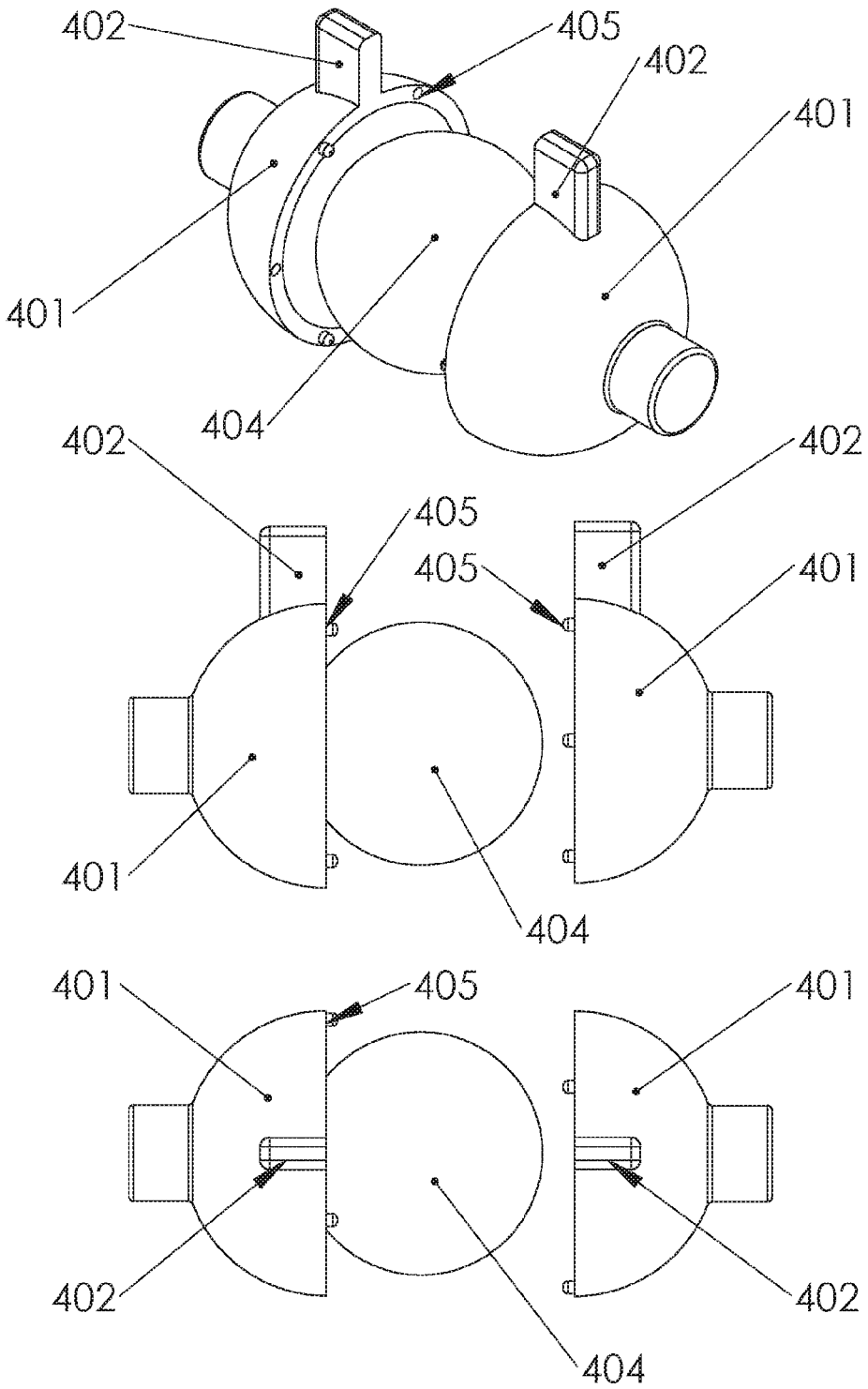
FIG. 24 shows said spherical magnet being disposed within spherical magnet cap enclosure.

Another embodiment of the present invention in FIG. 24 illustrates the insertion of said spherical magnet 404 and is disposed into each half of said hollow hemisphere 401 with said tangent protruding axle means 403 and said flip tab half 402 tangent to the hemisphere 401 and positioned at its outer rim. Said flip tab halves are locked inline to each other by a plurality of keyed synchronized male nubs 405 and female nub receptors 405.

Figure 25:
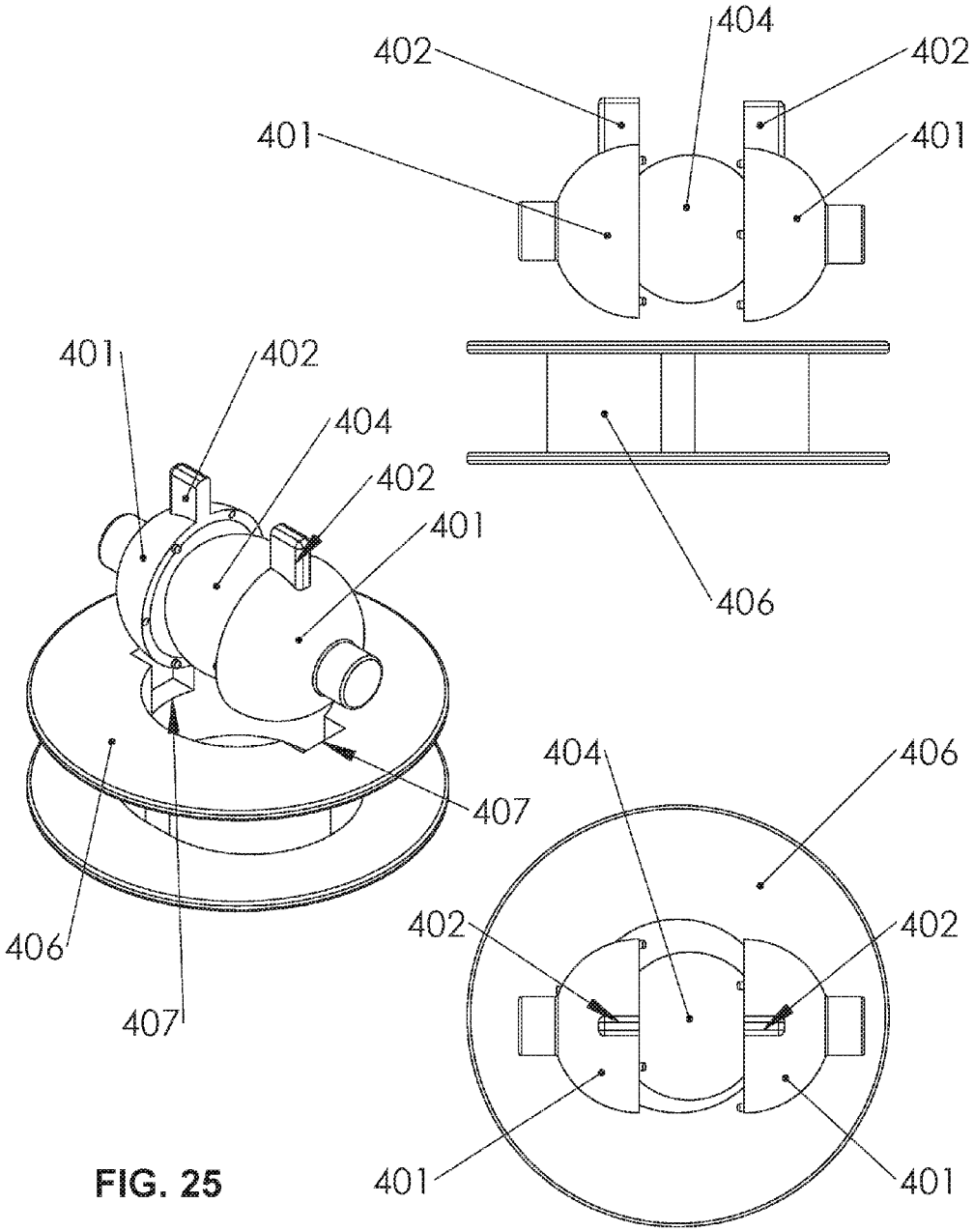
FIG. 25 shows how said spherical magnet and its enclosure are disposed in said coil bobbin means.

Another embodiment of the present invention in FIG. 25 shows said magnet enclosure means comprised of two halves of said hollow hemisphere 401 with said tangent protruding axle means 403 and said flip tab half 402 tangent to the hemisphere 401 and positioned at its outer rim and said coil bobbin 406 of which a plurality of sufficient enameled copper wire turns are wound around said coil bobbin 406 to create an electric coil that will generate electrical energy during any movement of magnet enclosure assembly means 400 that is further disposed into said coil bobbin 406. Said magnet enclosure assembly means 400 has its axle components fitted and disposed in coil bobbin axle wells 407 and further said enclosure axle component means 403 are free and unrestricted to rotate within said axle wells 407.

Figure 26:
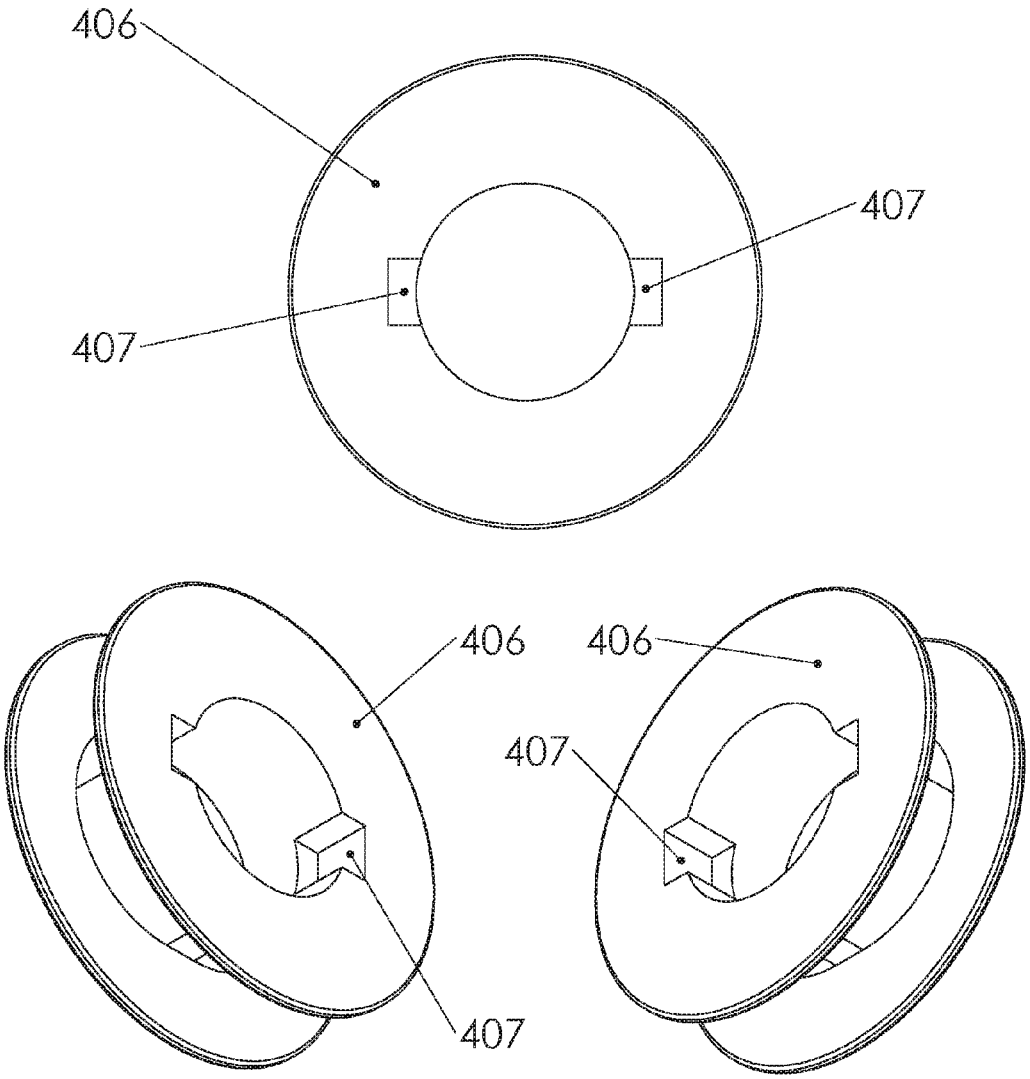
FIG. 26 shows said coil bobbin means with its axle wells.

Another embodiment of the present invention in FIG. 26 shows said coil bobbin 406 and its axle wells 407 for containing a set of axles.

Figure 27:
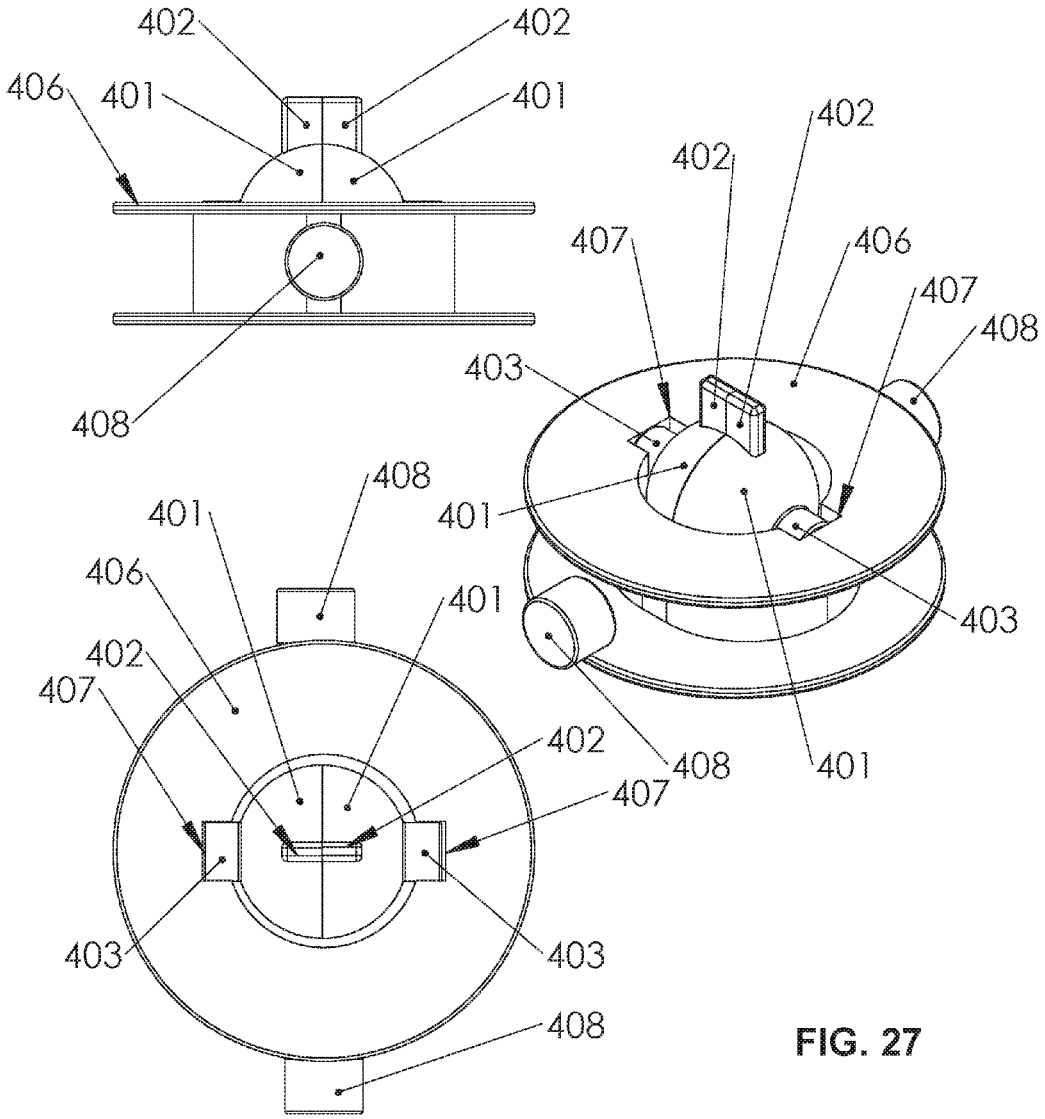
FIG. 27 shows complete operational insertion of magnet cap assembly into said coil bobbin.

Another embodiment of the present invention in FIG. 27 shows said functional energy harvesting generator that is comprised of spherical magnet enclosed within said enclosure 400 comprised of hollow spherical cap 401 with tangent axles 403 and said flip tab 402 whereby said magnet enclosure 400 is inserted and free to rotate within said coil bobbin axle wells 407 as member to coil bobbin 406; for the purpose of generating electrical energy.

Figure 28:
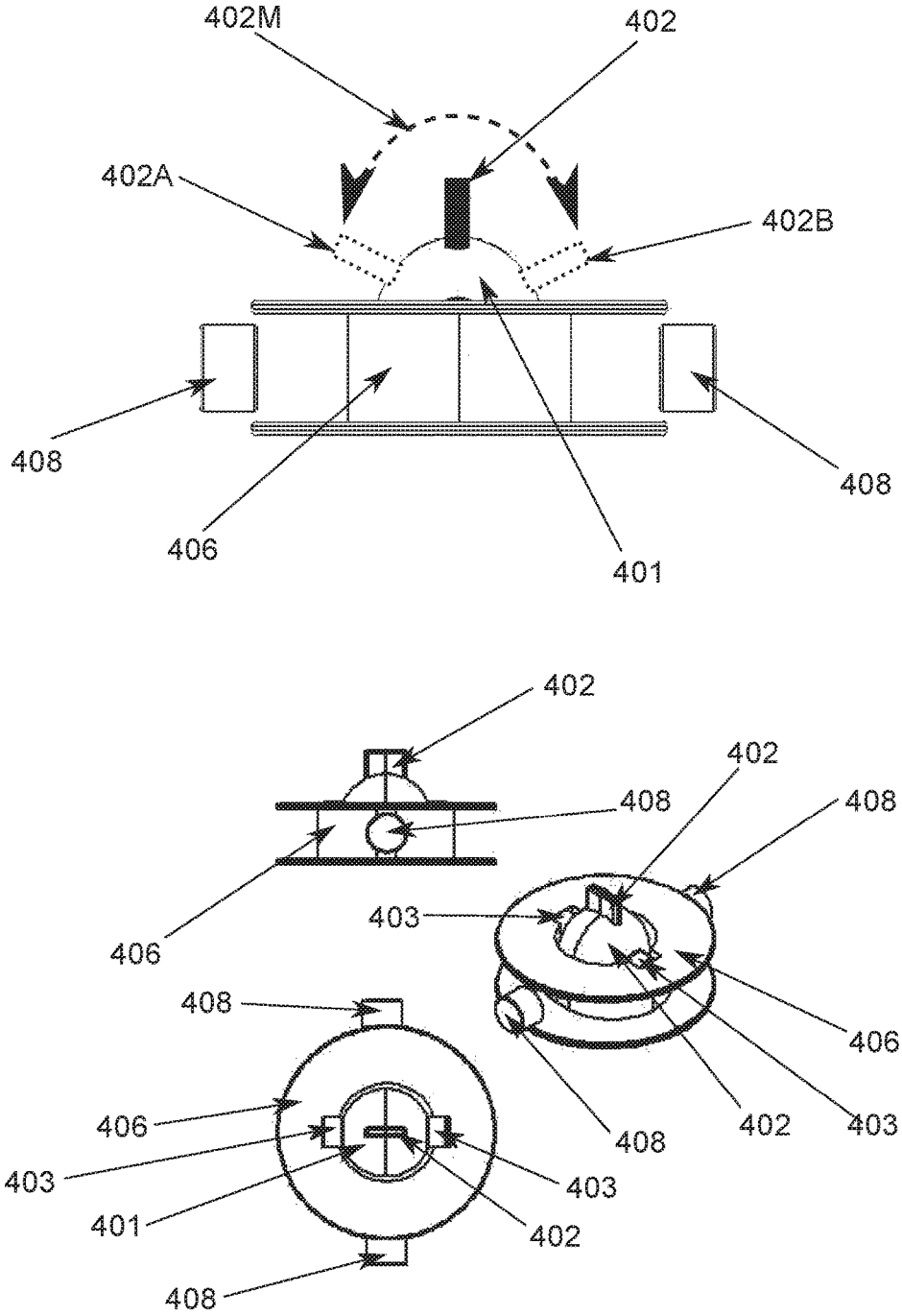
FIG. 28 shows the two way flip operation of said spherical magnet enclosure.

Another embodiment of the present invention in FIG. 28 illustrates the flip action of said energy harvesting generator whereby said enclosure 400 comprised of hollow spherical cap 401 with tangent axles 403 and said flip tab 402 remains moveable (flappable) in a forward and reverse motion, and whereby said motion causes said enclosed spherical magnet to move and with this movement consequently it ambient residual magnetic field. There are disposed a plurality of focus magnets 408 that are aligned and disposed along the sides of said coil 406 in such a manner as to have their corresponding magnetic fields aligned inline, and facing North pole to South pole so as to provide a magnetic force field that will keep said magnet enclosure 400 and consequently its flip tab positioned centre vertical 402, but not restricted to centre vertical and is free to flip in an angular forward 402A or reverse 402B direction and due to the inline attractive magnetic field established by said focus magnets 408. This action of said inline focus magnets 408 with their inherent magnetic fields established a spring action that causes a damped oscillatory motion and consequently a damped alternating current within said coil wire that is wound around said coil bobbin 406.

Another embodiment of the present invention in FIG. 29 illustrates two different battery-less, powered by said energy harvesting generators 500 of ISM ENIGMA, LLC., and International ISM Band wireless electrical remote power switch with said dimming features. Model 501 is of the configuration model having an indicator LED 503, a flip tab control means 504, a dimmer potentiometer 506 with grey scale level graph 505. Wherein as flip tab 504 is moved by a consumer in either an up or down flipping motion, said indicator LED 503 blinks momentarily indicating that the unit is generating power for its internal ISM Band transmitter that has a single frequency of a possible plurality of designated approved and licensed ISM Band of frequencies for International operation; and dim level that has been set is sent along with a permanent key code that is instantly established upon an initial flip tab 504 operation. A designated receiver with same key code and frequency receives said ON/OFF information and fixed dime level established by the setting of the transmitter potentiometer, and further said receiver is electrically connected in series with an electrical load such as a lighting fixture, but not limited to a lighting fixture; in general any electrical load within said receiver's power load capabilities that can be a plurality of levels dependent on model type. Model 502 is of the configuration model having an indicator LED 503, a flip tab control means 504, and a slide switch 507 that allows an ON/OFF position and a dimming position. When said slide switch 507 is in the ON/OFF position, said flip tab 504 is moved by a consumer in either an up or down flipping motion, said indicator LED 503 blinks momentarily indicating that the unit is generating power for its internal ISM Band transmitter that has a single frequency of a possible plurality of designated approved and licensed ISM Band of frequencies for International operation; and a permanent key code is instantly established upon an initial flip tab 504 operation and transmitted. A designated receiver with same key code and frequency is electrically connected in series with an electrical load such as a lighting fixture, but not limited to a lighting fixture; in general any electrical load within said receiver's power load capabilities that can be a plurality of levels dependent on model type. After a light or any designated electrically connected load is turned on, if said slide switch 507 is moved into its Auto Dim mode position another flick of said flip tab 504 send a different code via the same single transmitter and frequency to said designated receiver where an auto dimming feature is triggered into operation. Said dimming feature now, is of the type that allows for a continuous slow oscillating of the brightness or power level to increase and decrease periodically, thus giving a consumer time to decide what level is suited for the occasion. Once a level is decided, another flick of said tab cause the dim level to be memorized and constant in said decided level of power or brightness. Any future dimming choices can be made by a consumer simply be re-flicking said flip tab 504 and observing the slow undulations of brightness levels for a new choice of dimming level.

Figure 30:
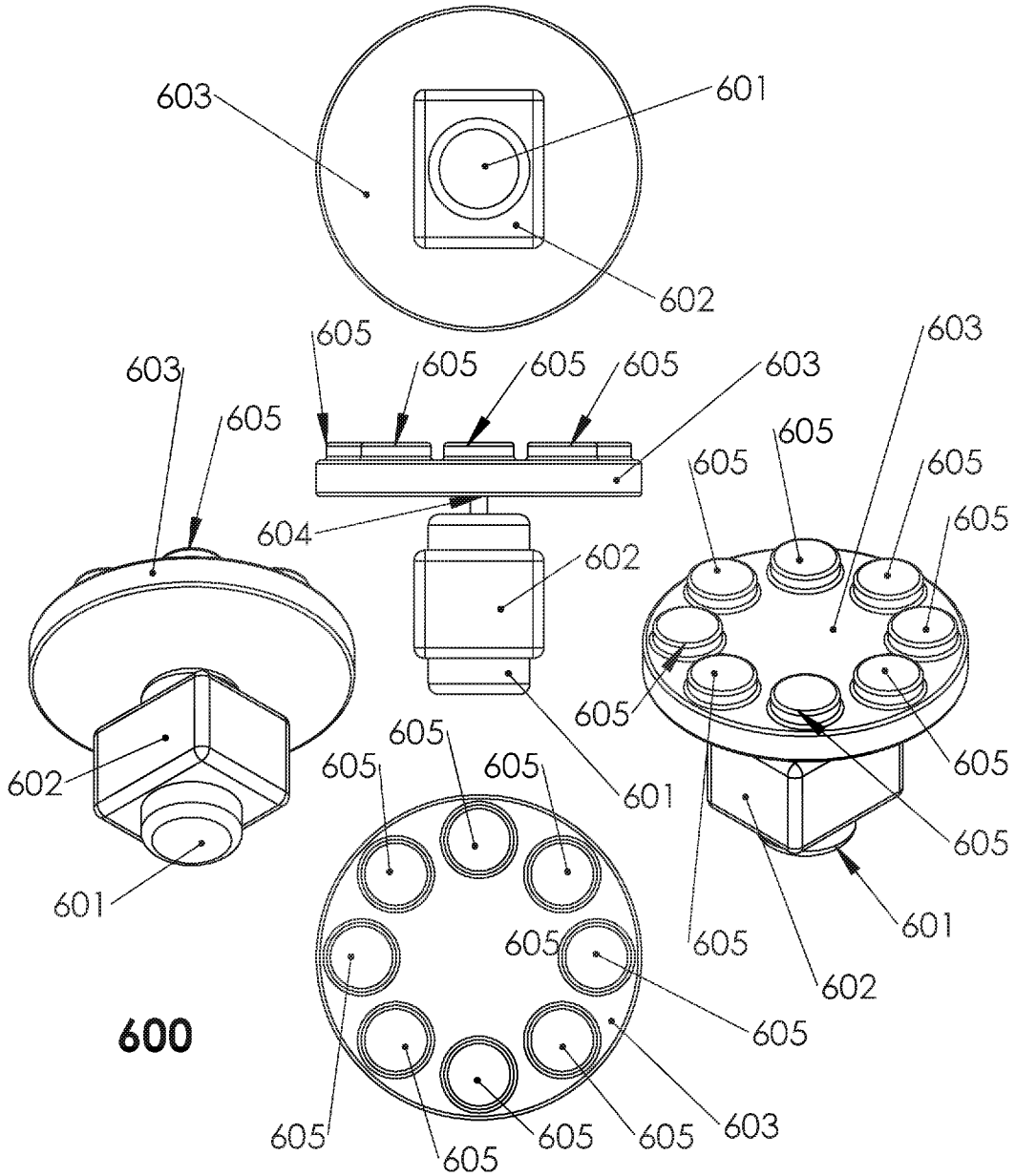
FIG. 30 shows a motor driven magnet array for recharging an ISM ENIGMA battery-less and wireless electrical switch.

Another embodiment of the present invention in FIG. 30 illustrates a method means for utilizing said energy harvesting generator of said present invention and in conjunction with another embodiment of an ISM ENIGMA battery-less and wireless electrical switch. FIG. 30 shows a motor 601 driven circular array 603 of a plurality of disk type, but not limited to disk type, magnets 605 disposed on a disk 603 that is connected by an axle 604 to a rotating motor 601 contained in a motor support means 602. Said disk type, but not limited to disk type, magnets 605 are arranged in a manner so as to allow their corresponding magnetic fields (not illustrated but implied) to be aligned as a North to South pole configuration means that disposes them with an adjacent face up opposite pole alignment.

Figure 31:
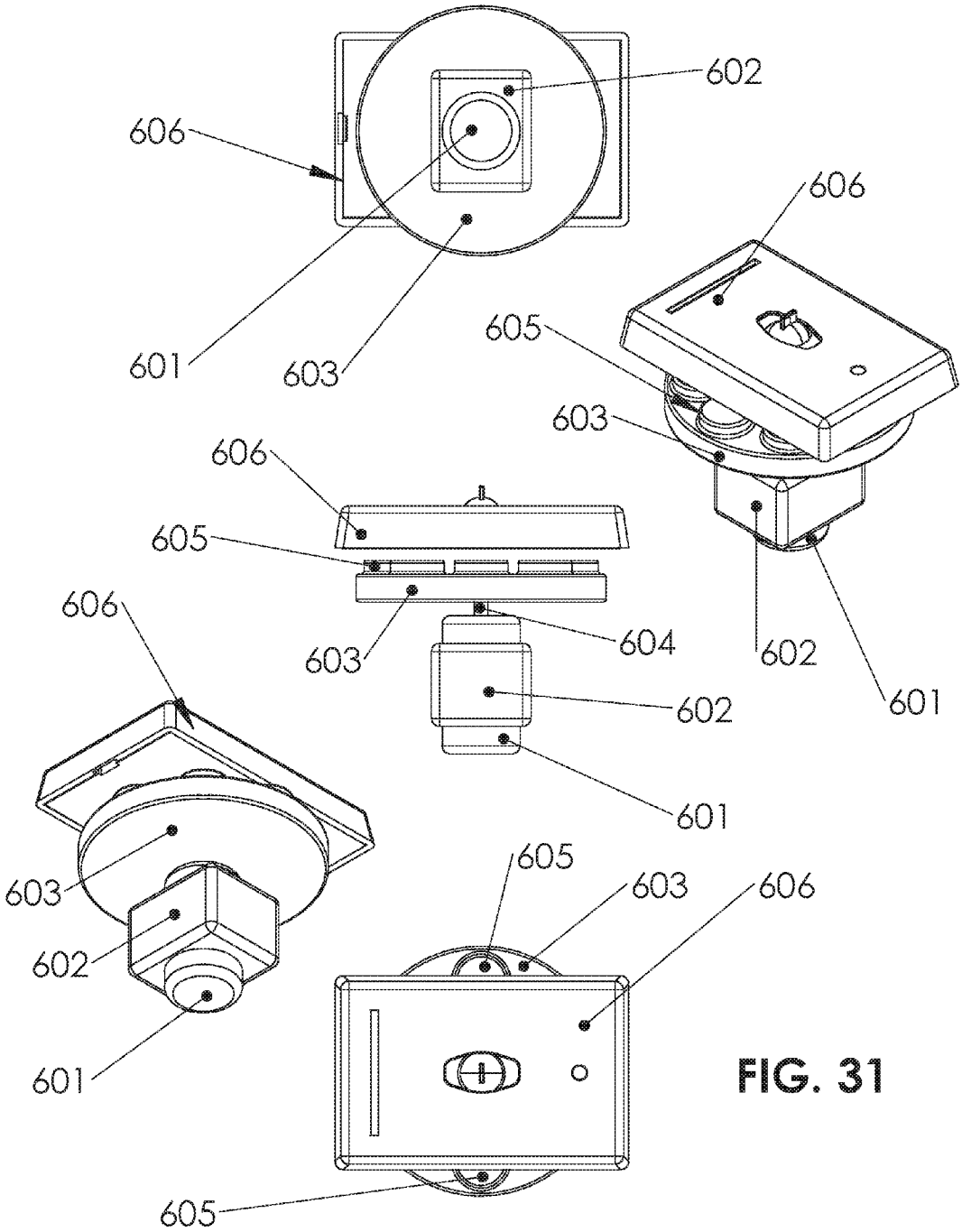
FIG. 31 shows an ISM ENIGMA battery-less and wireless electrical switch in close proximity to magnet array for recharging.

A further corresponding embodiment shown in FIG. 31 illustrates an operation of positioning an ISM ENIGMA battery-less remote switch 606 in close proximity to said disk type magnet 605 array disposed on circular array plate 603, whereby as said motor 601 is rotating and consequently as said circular array plate rotates by its connexion to said motor 601 disposed on motor axle 604. When said ISM ENIGMA battery-less switch 603 is placed in close proximity to said EH recharger as seen in FIG. 30, upon high speed rotation of said recharging array plate 603 and disposed arrayed disk magnets 605 their respective magnetic fields are set in motion and cut through said coil bobbin windings contained within said switch enclosure 606. This continuous rotating magnet field action continues to induce electrical currents into said coil windings that are electrically connected to a recharging bank of super capacitors that in effect act as a rechargeable battery, and where said super capacitor bank can be utilized through a USB connexion for any outside world recharging purpose such as the recharging of a cell phone, tablet, or laptop computer. It should also be understood by those steeped in the art that this accumulated charge acne be utilized by the switch circuitry itself.

What is claimed is:

1. An electrical generator comprising:

*a coil-wire form having a perimeter and a first planar surface and a second planar surface;* a [plurality of] permanent [magnets] *magnet* disposed to be rotational [with each other] about a [common] center axle[, each magnet] *that extends in a plane parallel to the first planar surface or the second planar surface, wherein the permanent magnet is at least partially retained within and adjacent to the perimeter of the coil wire form and permanent magnet also* having [their] North and South magnetic poles[directionally parallel to each other within a coil-wire form having a circumference and with a centered hole disposed with adjacent axle inset wells each extending along a well axis, adapted to mechanically retain said center axle position rotatable about said well axis and said plurality of permanent magnets within said coil-wire form]; *and*

[a plurality of turns of wire disposed on said coil-wire form circumference and wrapped in a plane parallel to said well axis,]

[wherein said coil-wire form includes a plurality of disposed stationary insets each including one of a plurality of focus permanent magnets disposed at said circumference of said coil-wire form and are disposed and aligned to each have an axis through each magnet poles perpendicular to said inset wells axis and to be magnetically attractive to said plurality of permanent magnets] *a focus permanent magnet pair disposed outside of and adjacent to the perimeter of the coil wire form, wherein the focus permanent magnet pair includes a first focus permanent magnet and a second focus permanent magnet positioned on an opposite side of the perimeter of the coil wire form from the first focus permanent magnet, and* wherein [said plurality of focus permanent magnets increases magnetic flux line density in a region of said plurality turns of wire and] rotation of [said plurality of] *the* permanent [magnets within said coil-wire form centered hole] *magnet* induces an electrical [current within said plurality of turns of wire] *voltage in the coil wire form.*

[2. The electrical generator as recited in claim 1, wherein each of said plurality of permanent magnets comprises a spherical shape permanent magnet wherein each said plurality of permanent magnet's North and South magnetic lines of force are perpendicular at the poles to the common center axle axis.]

[3. The electrical generator as recited in claim 1, wherein each of said plurality of permanent magnets is disposed in a non-magnetic spherical shape material.]

[4. The electrical generator as recited in claim 1, wherein each of said plurality of permanent magnets is disposed in a solid non-magnetic serrated wheel shaped member and includes a through hole disposed to accommodate one of said said plurality of permanent magnets.]

[5. The electrical generator as recited in claim 1, wherein a plurality of permanent magnets are disposed on each of a plurality of solid non-magnetic material serrated wheel-shaped elements wherein each element includes a plurality of centered blind holes whose opening diameter receives one of said plurality of cylindrical permanent magnets wherein said wheel-shaped elements are retained on said common center axle to provide synchronized rotation of said cylindrical permanent magnets and wherein each said permanent magnets' North and South magnetic lines of force are substantially perpendicular at the poles, to said common center axle axis.]

*6. The electrical generator of claim 1, wherein the permanent magnet is at least partially encapsulated in a cover.*

*7. The electrical generator of claim 1, wherein the permanent magnet is configured to rotate in response to an applied force.*

*8. The electrical generator of claim 1, wherein the first focus permanent magnet and the second focus permanent magnet of the focus permanent magnet pair are aligned to be coplanar with one another.*

*9. The electrical generator of claim 1, wherein the focus permanent magnet pair is aligned on an axis perpendicular to the center axle.*

*10. An electrical generator comprising:*

*a coil-wire form comprising a perimeter and a first planar surface and a second planar surface and a center hole extending between the first planar surface and the second planar surface;*

*a permanent magnet at least partially positioned in the center hole and rotatable within the center hole about a first axis, wherein the first axis extends in a plane that is parallel to the first planar surface or the second planar surface;*

*a focus magnet pair outside of and adjacent to the perimeter of the coil wire form, the focus magnet pair including a first focus magnet and a second focus magnet positioned on an opposite side of the perimeter of the coil wire form from the first focus magnet, and*

*wherein rotation of the permanent magnet within the center hole induces an electrical voltage in the coil wire form.*

*11. The electrical generator of claim 10, wherein the permanent magnet is at least partially encapsulated in a cover.*

*12. The electrical generator of claim 10, wherein the permanent magnet is configured to rotate in response to an applied force.*

*13. The electrical generator of claim 10, further comprising:*

*a second permanent magnet at least partially positioned in the center hole and rotatable within the center hole about the first axis;*

*a second focus magnet pair outside of and adjacent to the perimeter of the coil wire form, the second focus magnet pair including a third focus magnet and a fourth focus magnet positioned on an opposite side of the perimeter of the coil wire form from the third focus magnet, and*

*wherein rotation of the second permanent magnet within the center hole induces an electrical voltage in the coil wire form.*

*14. The electrical generator of claim 1 further comprising:*

*a second permanent magnet disposed to be rotational about the center axle and having North and South magnetic poles, wherein the second permanent magnet is at least partially retained within and adjacent to the perimeter of the coil wire form; and*

*a second focus permanent magnet pair disposed outside of and adjacent to the perimeter of the coil wire form, wherein the second focus permanent magnet pair includes a third focus permanent magnet and a fourth focus permanent magnet positioned on an opposite side of the perimeter of the coil wire form from the third focus permanent magnet, and*

*wherein rotation of the second permanent magnet induces an electrical voltage in the perimeter of the coil wire form.*

* * * * *